United States Patent
Schu et al.

(10) Patent No.: US 11,337,036 B1
(45) Date of Patent: May 17, 2022

(54) PROVIDING EVENTS ON A MAP USING AN ACTIVITY ONTOLOGY FOR EVENT SUGGESTION

(71) Applicant: TeamGo, Inc., Portland, OR (US)

(72) Inventors: Emily Schu, Los Angeles, CA (US); Danish Aziz, Portland, OR (US); Sean Conrad, Portland, OR (US); Jesse Erin Berns, Los Angeles, CA (US)

(73) Assignee: TEAMGO, INC., PORTLAND, OR (US)

( * ) Notice: Subject to any disclaimer, the term of this patent is extended or adjusted under 35 U.S.C. 154(b) by 0 days.

(21) Appl. No.: 17/386,306

(22) Filed: Jul. 27, 2021

Related U.S. Application Data

(60) Provisional application No. 63/195,537, filed on Jun. 1, 2021.

(51) Int. Cl.
| | |
|---|---|
| *H04W 4/029* | (2018.01) |
| *H04W 4/02* | (2018.01) |
| *H04W 4/21* | (2018.01) |
| *H04W 8/18* | (2009.01) |

(52) U.S. Cl.
CPC .......... *H04W 4/029* (2018.02); *H04W 4/023* (2013.01); *H04W 4/027* (2013.01); *H04W 4/21* (2018.02); *H04W 8/18* (2013.01)

(58) Field of Classification Search
CPC ....... H04W 4/029; H04W 4/21; H04W 4/023; H04W 4/027; H04W 8/18
USPC .................................................... 455/456.3
See application file for complete search history.

(56) References Cited

U.S. PATENT DOCUMENTS

| | | | | |
|---|---|---|---|---|
| 9,147,336 | B2* | 9/2015 | Schultz | G08G 1/205 |
| 9,253,615 | B2* | 2/2016 | Ickman | H04W 4/21 |
| 2006/0143214 | A1 | 6/2006 | Teicher | |
| 2007/0006098 | A1* | 1/2007 | Krumm | H04W 4/18 |
| | | | | 715/825 |
| 2008/0098313 | A1* | 4/2008 | Pollack | G06F 3/048 |
| | | | | 715/753 |
| 2008/0140650 | A1* | 6/2008 | Stackpole | H04L 67/18 |
| | | | | 707/999.005 |
| 2008/0275969 | A1* | 11/2008 | Saba | G06Q 10/00 |
| | | | | 709/220 |
| 2009/0176509 | A1* | 7/2009 | Davis | H04W 4/02 |
| | | | | 455/456.3 |
| 2009/0240429 | A1* | 9/2009 | Tanaka | G01C 21/343 |
| | | | | 707/999.107 |
| 2012/0136689 | A1 | 5/2012 | Ickman et al. | |

(Continued)

OTHER PUBLICATIONS

USPTO, Final Office Action for U.S. Appl. No. 17/343,550. dated Nov. 29, 2021. 20 pages.

(Continued)

*Primary Examiner* — William Nealon
(74) *Attorney, Agent, or Firm* — Perkins Coie LLP

(57) ABSTRACT

Disclosed is a system and method to present events relevant to the user on a map. The system obtains an indication of a user's location, and a predetermined threshold indicating a distance between the user and an event. The system obtains events that are relevant to the user. Based on the user's location, and the predetermined threshold, the system determines a second set of events based on the events, where an event in the second set of events is within the predetermined threshold away from the user's location.

26 Claims, 15 Drawing Sheets

(56) References Cited

U.S. PATENT DOCUMENTS

| | | |
|---|---|---|
| 2012/0290977 A1 | 11/2012 | Devecka |
| 2014/0074824 A1 | 3/2014 | Rad et al. |
| 2015/0169659 A1 | 6/2015 | Lee et al. |
| 2016/0125502 A1* | 5/2016 | Byron .................. G06Q 10/025 |
| | | 705/6 |
| 2016/0182434 A1* | 6/2016 | Systrom .................. H04W 4/12 |
| | | 709/206 |
| 2017/0286924 A1 | 10/2017 | Tazono |
| 2017/0347240 A1* | 11/2017 | Wilde ................... H04W 4/029 |
| 2018/0058870 A1* | 3/2018 | Gaebler ........... G08G 1/096733 |
| 2019/0190874 A1 | 6/2019 | Petrosian et al. |

OTHER PUBLICATIONS

USPTO, Non-Final Office Action for U.S. Appl. No. 17/343,550. dated Oct. 7, 2021. 16 pages.

* cited by examiner

| INTERESTS GROUPED ||||
| Culture | Entertainment | Lifestyle | Physical |
| --- | --- | --- | --- |
| 20 | 20 | 20 | 20 |
| Animals/Pets | Bar Games | Burners | Beach Stuff |
| Art Lovers | Board Games | Childbirth | Cycling |
| Beer | Comedy | Community Activism | Disc Golf |
| Best Of | Concerts | Goth | Endurance Athletes |
| Book Lovers | Electronica | Hippies | Extreme Sports |
| Cars | Family Fun | Hunt & Fish | Fitness |
| Coffee | Fantasy Sports | LGBTQ+ | Golf |
| Comics | Gaming | Luxury | Great Outdoors |
| Crafting | Happy Hour | Meditation | Hiking |
| Technology | Jam Bands | Motorcycles | Horses |

PROVIDING EVENTS ON A MAP USING AN ACTIVITY ONTOLOGY FOR EVENT
SUGGESTION

CROSS-REFERENCE TO RELATED APPLICATIONS

This application claims priority to the U.S. provisional patent application Ser. No. 63/195,537 filed Jun. 1, 2021, which is incorporated herein by reference in its entirety.

BACKGROUND

Multiple platforms offer suggested events to users. However, the matching of events to users produces a cluttered webpage of multiple events, without a focal point enabling the user to isolate relevant events. In addition, the match between the suggested events and the user's interest can be suboptimal, thus resulting in event suggestions not attractive to the users.

BRIEF DESCRIPTION OF THE DRAWINGS

Implementations of the present invention will be described and explained in detail through the use of the accompanying drawings.

FIG. 2 shows a portion of the ontology 100 in FIG. 1 represented as a table.

FIGS. 4A, 4B, and 5 show operations that can be performed in the activity ontology admin console.

Figure 1:
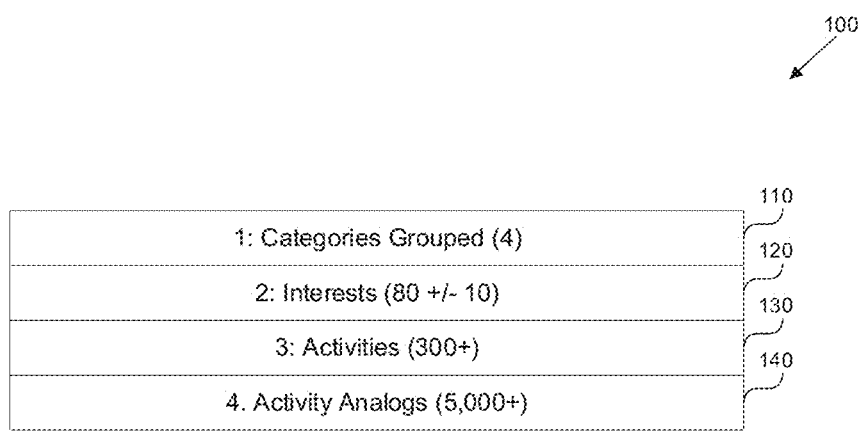
FIG. 1 shows the activity ontology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Disclosed is a system and method to present events, e.g. an event feed, on a map to the user. The system obtains an activity ontology structured into multiple hierarchical levels, including a group, an interest, an activity, and an activity analog. The group includes multiple interests, the interest includes multiple activities, and the activity includes multiple activity analogs. The system obtains an indication of an activity of interest to the user and multiple events created by one or more users of the system or obtained from users of another platform. Each event among the multiple events is tagged with one or more activities that describe the event. Among the multiple events, the system selects an event that matches the activities of interest to the user and creates the event feed, including the event for the user.

The system can display the events, such as in the form of the event feed, on the map indicating the location of the event relative to the location of the user. The system can obtain an indication of a user's geographical location by using a positioning system, such as a global positioning system (GPS), Wi-Fi triangulation, or a cellular triangulation. The system can obtain a speed of movement associated with the user, and a predetermined threshold indicating a length of time, such as 5, 10, or 15 minutes. Based on the user's geographical location, the speed of movement associated with the user and the predetermined threshold, the system can determine one or more events that are within the predetermined threshold away from the user's geographical location when the user moves at the obtained speed of movement. The system can create a map indicating a location of the events that are within 5, 10, or 15 minutes of the user. For example, if the user is walking, the system can provide to the user events that are 5 minutes' walking distance from the user. In another example, if the user is driving, the system can provide to the user events that are within 10 minutes' driving distance from the user. The system can proactively send notifications to a user if the user is nearby an event that the system determines is of interest to the user.

The disclosed system and method provide a social technology platform that combines a social network with an event finding and curation utility. The system is a web and mobile platform that uses an event finding utility and social platform to address the universally shared desires of users to see and do things they enjoy, and the need to spend more time with friends and family. By expanding the definition of an "activity" to include a wide array of social engagements, the system provides the world's most human-centric events platform helping users engage and interact in the same location. Every event provided by the system happens at a location that the user can visit and, upon visiting at the appropriate time, can engage in the event.

The disclosed system also layers a social network on top of the events platform to further add value to users' lives. The disclosed system enables users to share their availability, interests, and plans in a simple and transparent way. The disclosed system gathers the users' availability, interests, and plans and can analyze the gathered data to gain deep insights about the users' social circle. In addition, the system can share the insights gained about a particular user with the user's friends and make the insights actionable. For example, the system can determine when the particular user is available and can notify the user's friends that the particular user is available. The system can ask the friends if they want to make plans with the particular user during the time that the particular user is available.

For merchants, the system provides an opportunity to create events in the system. The system then automatically adds the created events to the event feed of the users whose interests match the event.

To provide end-users with a uniquely curated feed of events pertinent to their interests and activity patterns, the system utilizes a dictionary and a data structure of user-inputted activities and events on the system platform. The activities a user selects, as their initial interests at sign up and throughout their journey, guide the user's experience and provide a central value proposition of the system: a curated feed of activities based on user preferences and behaviors. The system can obtain collections of events generated from many different methods such as from manual generation, machine learning, tag-based generation, etc. Further, the system can display the events in various formats including a vertical feed, a horizontal feed, a card stack etc. The display of the events can vary depending on person, location, and/or time of day.

Providing Events on a Map Using Activity Ontology for Event Suggestion

FIG. 1 shows the activity ontology. The system's activity ontology ("ontology") 100 provides a classification of activities that is exhaustive. The system is also referred to as the "platform" in this description. The activity ontology 100 is hierarchical and includes the group 110, interests 120, activities 130, and activity analogs 140. The base level of the hierarchy, the group 110, includes interest 120, which includes activities 130, which includes activity analogs 140.

The group 110 has four elements, such as culture, entertainment, lifestyle, physical. The group 110 categorizes interests into a specific, socially recognizable class of meta-interest. Each group is subdivided into interests 120. There can be approximately 70-90 interests in each group. For example, culture can include pets, art, beer, books, cars, coffee, etc. Entertainment can include bar games, board games, comedy, concerts, family fun, etc. Lifestyle can include childbirth, community activism, luxury, meditation, motorcycles, nomads, etc. Physical can include cycling, golf, extreme sports, hiking, horses, etc. Each interest 120 can have over 300 activities 130. The interest 120 groups activities into a specific, socially recognizable class of meta-activity. The system uses the interest 120 for interest selection and activity search.

Each interest 120 can be subdivided into over 300 activities 130. The activity 130 corresponds to a specific, singular event type and central unit of the system's event taxonomy. An event is a user-created event, web scraper aggregated event, or series of events presented to users in the system's consumer facing applications. For example, the interest "pets" can include activities, such as animal shelter events, breed shows, wild animal watching, pet sitting, etc. The interest "board games" can include activities, such as board-game conventions, boardgame sales, chess tournaments, Go tournaments, etc. The interest "cycling" can include events, such as bike tours, club rides, cycle shop events, road bike sales, etc. The interest "meditation" can include events, such as stargazing, meditation workshops, mindfulness, etc.

Each activity 130 can have an activity analog 140. The activity analog includes all possible semantic permutations of a specific activity, such as semantic equivalents and/or synonyms. For example, the activity "art exhibits" can have activity analogs, such as gallery openings, art exhibits of individual artists, art exhibit in museums, art exhibits, avant-garde/public space art shows, underground art shows, etc.

Every activity belongs to a parent unit of classification (i.e., interest 120), and child unit activity 130 or activity analog 140. At the core of differentiation between activities lies the concept of universal activity identification by users. Using the ontological framework of dependence, activities are dependent due to shared classification as human social interactions, either with oneself or with others. Thus, the system's attempts to capture all possible human social interactions create an intrinsic universe of dependence. For example, if "running" exists as a possible activity in this framework, so must "cycling," as they are both activities in the universality of all possible social conditions of social interaction.

Much of the array of activities individuals and groups participate in has a high level of hierarchical overlap. One can ride a bicycle during the daytime or at night. Indoors or out. Alone or in a small group or with hundreds of others. Whether it is sunny or a monsoon, blinding heat or freezing cold. Much like cycling, many other activities in the system taxonomy are possible in a variety of situations and sizes. Thus, creating structure beyond a flat list takes a certain degree of subjectivity. One may consider eating a meal at a new restaurant with friends a "foodie" event and only possible during dinner service. Others may be a bit more flexible with meal service time. More complicated is the definition of this activity. Is it a "foodie" event or simply "dinner"?

Instead of constructing a model with a temporal, diurnal, or exertion-based hierarchy, one was constructed that binned "like activities." This method is subjective and requires extensive iterations. However, due to the vast number of activities possible on the platform (500+), activity binning by similar interest is necessary. Without binning, site navigation, activity creation, search, and feed curation is onerous for the user.

The activity ontology 100 is a core method of classifying and organizing understanding of the system usage, as well as providing users with relevant information as they navigate on and off the platform. Activity ontology 100 is a structural framework of activities, activity analogs, interests, groups, and other tagged classifications for each term that lives in the event paradigm.

The current ontology purpose is two-fold: a reference mechanism for activity-based inputs and outputs, as well as a guidebook for all things related to the user activity taxonomy. The ontology includes a dictionary of activities. The dictionary is an exhaustive list of all possible activities a user, such as an individual user or a business, can create, attend, and share with one another. The dictionary includes one table in the activity ontology 100. The dictionary has a hierarchical dependency structure in accordance with ontological dependence in order to be used reasonably by end-users. Without the hierarchy, the sheer number of activities to sift through while creating, finding, and sharing events would be onerous, and would likely result in frustration by most, if not all, end-users.

To access, modify, and tailor activity ontology 100 for particular user groups, a tool was created for internal staff. This tool, known as the Activity Ontology Admin Console, allows a non-technical user to modify, manage, and monitor the activities ontology. As the system scales, the tool becomes the primary access point for non-technical staff for all activities on-app. The hierarchy levels 110, 120, 130, 140 can be modified through the activity ontology admin console. The hierarchies can be modified by the administrator, or by the machine learning/artificial intelligence model that can update the ontology 100 based on information gathered from various users through the system.

FIG. 2 shows a portion of the ontology 100 in FIG. 1 represented as a table. The ontology 100 can be represented as a table 200 and is scalable. The table 200 shows the groups 110 in FIG. 1, and some of the interests in each element of the group. New entries can be added at each hierarchy level 110, 120, 130, 140 in FIG. 1. In addition, a programming module, such as a Python module, can enable ontology 100 versioning and hierarchical bin width routine assessments and modifications per end-user to and from a relational database, such as PostgreSQL. The ontology versioning can enable storing of previous versions of the ontology 100 as the ontology changes. The ontology versioning can be used to perform analysis of the user data by relating user data to the relevant ontology version.

Figure 3:
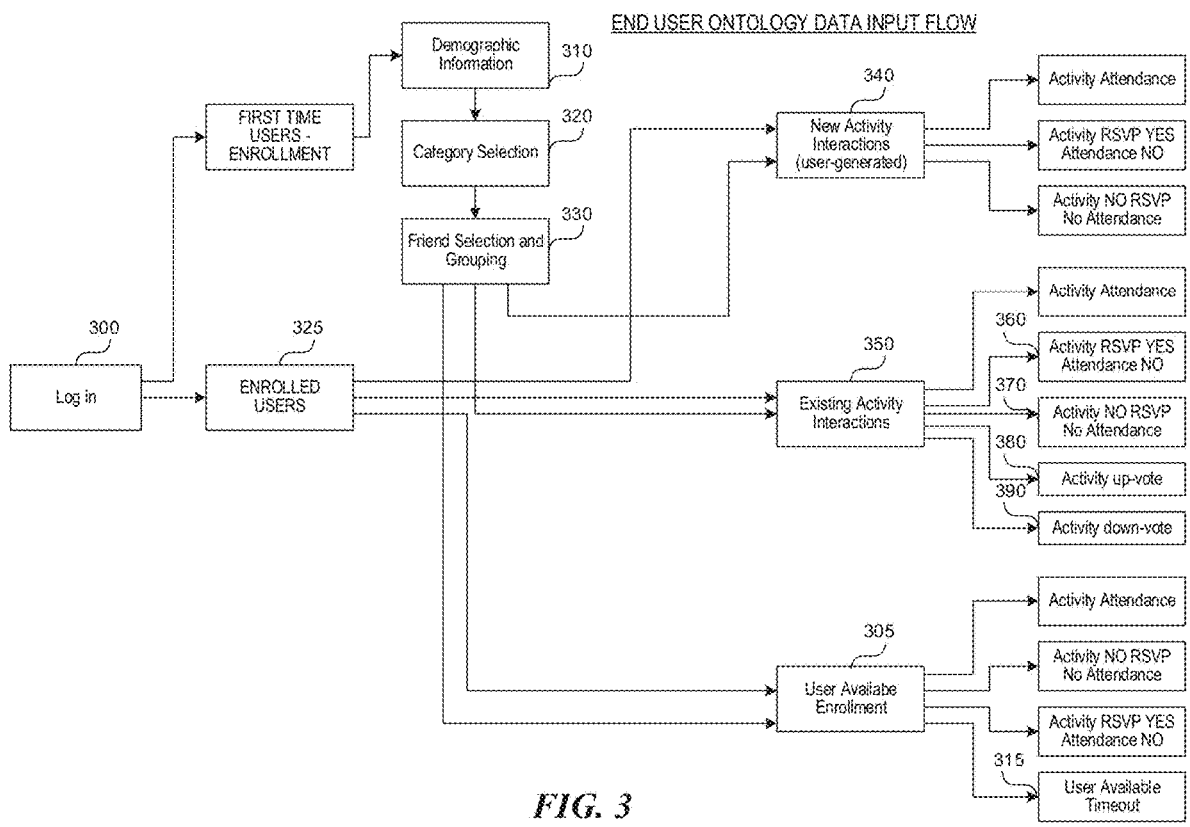
FIG. 3 shows a user workflow when interacting with the system.

FIG. 3 shows a user workflow when interacting with the system. Upon login, in step 300, the system asks first-time users to provide demographic and geographic information in step 310, and then, in step 320, to select one or more interests in each category group 110 in FIG. 1. For example, in step 320, the user can select the following interests: bicycles, coffee, hiking, and volleyball. In step 330, the user can select friends that are users of the system and can group them. Upon completing steps 310-330, the first-time user's workflow matches the repeat user's workflow.

In step 330, initially, the system can perform friend grouping during the onboarding when the user selects friends from the user's contact list, such as the user's phone's contact list. Once the user becomes a repeat user, and starts using the system beginning with step 325, the user can find new friends via events in which the user is interested. For example, the events in which the user is interested can provide a list of attendees to the event, and the user can select friends from the provided list.

When creating an event, the user can select the users who can see the event. In one example, when selecting the users who can see the events, the user can select one or more of the following categories "myself, my friends, and everyone." In another example, when creating an event, the user can select certain friends to view an event, instead of "all friends." The system can populate the selection of friends by default per event based on what the system knows about the event and the friends' interests, friends' past event attendance, friends' location, etc. The user can choose to edit the pre-populated list as desired.

When the user adds a friend, the user can see all events that the friend is creating and posting on the user's feed. In addition to following the user's friend network and selected activity interests, the user can also follow public figures and influencers who are members of the system.

When the user completes the interest selection, the system provides an event feed to the user through which the user can scroll. The event feed is a series of activities in the user's geographic area generated from a combination of a web crawler gathering the events available on the Internet and events that are unique to the system, such as events posted by friends of the user and events posted by privileged users. The privileged users can be subscription users of the platform, such as businesses that want to advertise events at their establishments. The privileged users can also be influencers, who are incentivized by the system to provide information about events in their area. The web crawler can gather events from other social platforms, such as Eventbrite, Songkick, or Meetup, every couple of minutes. The system can map the web crawler obtained event onto the activity ontology 100 in FIG. 1. To map the web crawler obtained event onto the activity ontology 100, the system can use natural language processing to determine a correspondence between an event and an interest 120 in FIG. 1.

The system filters the combination of events through the lens of the interests that the user has selected. Each event, whether obtained from the web crawler or from the system users, has a corresponding interest. An event can have one or more corresponding interests. The interests corresponding to the event and the user-specified interests are matched. When the event interest matches the user-specified interests, the event is provided in the event feed to the user.

In step 340, the user can create a new activity in the system. The system can automatically add the activity to a feed of other users. When the user enters the new activity, for example, the new events, the user enters the type of the event, for example, interest. The system can match the type of event to the interest of the users and provide the event to the event feed of the interested users. The event feed is prospective because the event feed provides events happening in the future, not events that happened in the past.

In step 350, the user can interact with an existing activity. The existing activity can be provided by a user of the system, or can be generated by a web crawler that scrapes activities from other platforms, such as Facebook, Eventbrite, etc., performs natural language processing on the script activity, and fits the activity into the ontology 100 in FIG. 1. To interact with the existing activity, the user can RSVP in steps 360, 370, or the user can rate the activity in steps 380, 390.

In step 305, the system allows the user to notify friends when the user is available at a press of a button. For example, the user can indicate the user is free within a predetermined period of time, such as the next 20 minutes, the next half hour, the next hour. The user can also indicate the user's location. Consequently, the system notifies the user's friends of the user's location and period of time when the user is available. The system also presents an accept button to the user's friends. If one of the user's friends selects the accept button, the system provides the friend and/or the user the ability to create an event indicating that the friend and the user are spending the time together. In step 315, the indication that the user is free can expire when the period of time during which the user has indicated availability has expired.

Figure 4A:
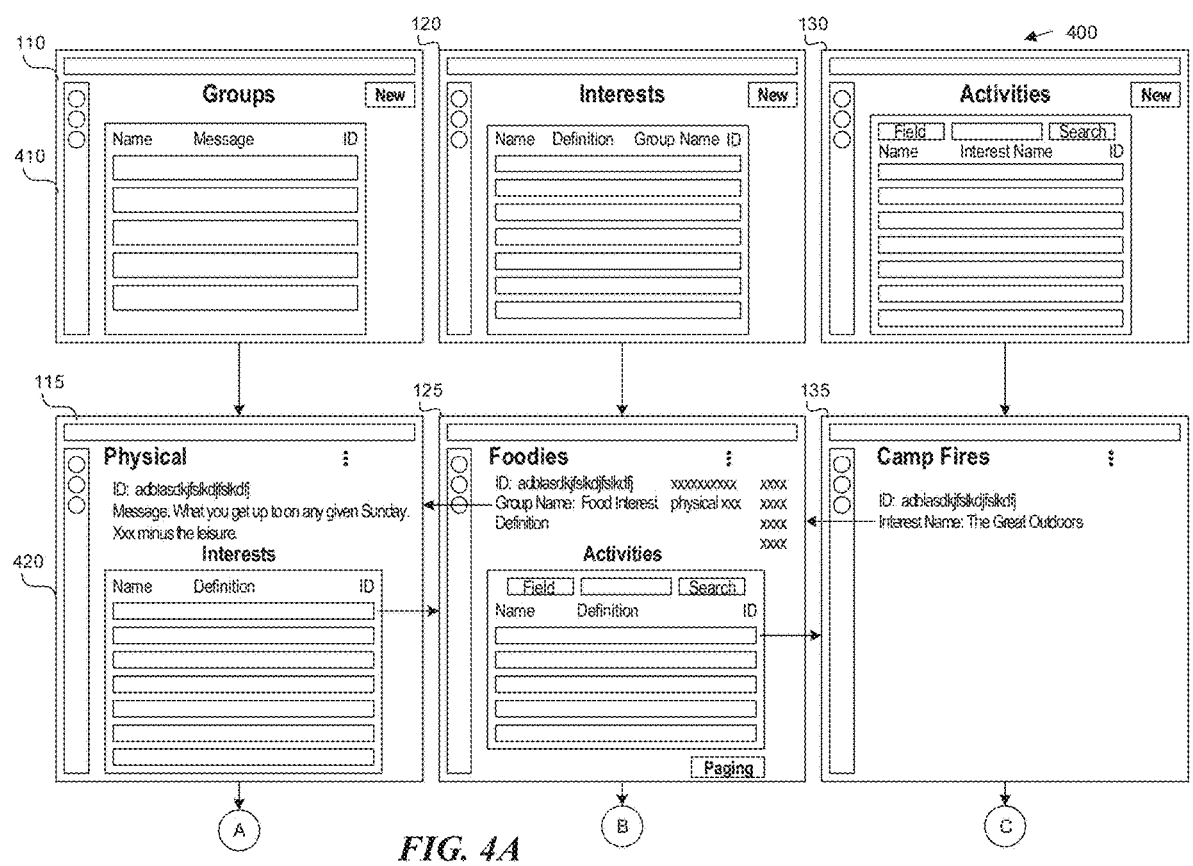
Figure 5:
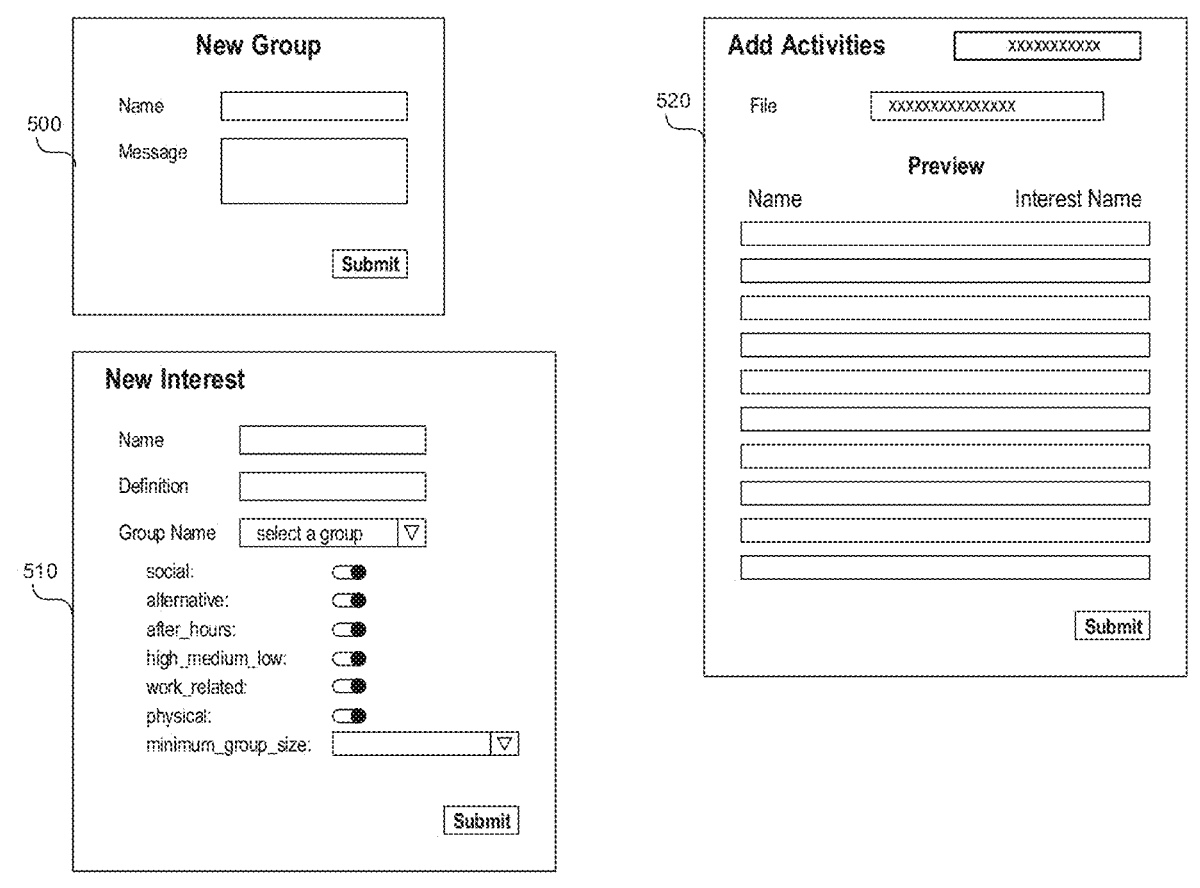

FIGS. 4A-5 show operations that can be performed in the activity ontology admin console ("tool"). The tool 400 is a UI for the system data scientists and developers to visualize ontology records and their associated geographical, temporal, and relational metadata; edit their ontology associations, mobile application presentations, searchability, and language-based attributes; create single or large volumes of new ontology records via comma separated values (CSV) file input; and manage the integration of user generated activities. The tool 400 leverages several services, including an Admin API for handling all https requests, authentication, and authorization; an Ontology API for interacting with a dedicated relational PostgreSQL database network; an ingress queueing service to distribute database writes globally; and a private Ontology NPM package to standardize the http requests to the Ontology API. The admin UI can be authored in Node.js inside a React framework, and the admin and ontology APIs can be authored in Node.js within an Apollo GraphQL framework.

The tool 400 can contain the following components:

| # | REQUIREMENT | USER STORY | ACCEPTANCE CRITERIA |
|---|---|---|---|
| 1 | Updating, adding, and removing groups | 'As a console user, I need to make changes to activity groups' | A. User can select group_name via search bar and update the group name.<br>B. User can create a new group that does not exist.<br>C. User will receive an error if they try to create a group that already exists.<br>D. User can select a group name via search bar and remove the group. User will see clear warnings prior to group deletion.<br>E. User will see System Error when the system restricts the delete action.<br>F. User will see the success message when system allows the delete action. |
| 2 | Updating, adding, and removing interests | 'As a console user, I need to make changes to interests' | A. User can select interest_name via the system search bar and modify interest_name.<br>B. User can create an interest that does not currently exist in the database.<br>C. User will receive an error if they attempt to create an interest that already exists in the database.<br>D. User can select an interest name via search.<br>E. User can delete an interest from the database. System will display clear warning prior to deletion.<br>F. User will see System Error if interest deletion is restricted.<br>G. System will display the success message if interest is successfully deleted. |
| 3 | Updating, adding, and removing activities | 'As a console user, I need to make changes to activities' | A. User can select activity_name via the system search bar and modify interest_name.<br>B. User can create an activity that does not currently exist in the database.<br>C. User will receive an error if they attempt to create an activity that already exists in the database.<br>D. User can select an activity name via search.<br>E. User can delete an activity from the database. System will display dear warning prior to deletion.<br>F. User will see System Error if activity deletion is restricted.<br>G. System will display the success message if activity is successfully deleted. |
| 4 | Managing interest properties | 'As a console user, I need to manage variable properties' | A. User can search for a database variable (interest, activity, group) and update/add/remove Boolean outcomes for variable properties (e.g., physical, after_hours, work_related. min_event_size). |
| 5 | Managing local activity dialectical variations | 'As a console user, I need to be able to create local dialectical activity analogs affixed to parent activity' | A. User can select an activity and update/add/remove child unit 'activity analog' based on local demographic pronunciation/spelling/terminology variance of parent unit.<br>B. User can save parent-child relationship.<br>C. User can search parent(activity)-childradivity analog) relationship. System will display parent-child relationship as well as queried item.<br>D. User will receive an error if they attempt to create an activity analog that already exists in the database.<br>E. User can select an activity analog via search.<br>F. User can delete an activity analog from the database. System will display clear warning prior to deletion.<br>G. User will see System Error if activity analog deletion is restricted.<br>H. System will display the success message if activity analog is successfully deleted. |
| 6 | Assigning uncategorized activities to interests | 'As a console user, I need to map unassigned child units (activities) to parent units (interests)' | A. User can search for an activity_name via search bar. System displays associated interest_name if association exists.<br>B. User can assign an interest if the association does not exist between parent and child units.<br>C. User can delete an activity-interest association. |

External users can access the tool 400 by, for example, using a combination of a Software Development Kit (SDK) and an Application Programming Interface (API) to create their own applications. The SDK and/or API can access the activity dictionary population, the system's activity taxonomy, and the system's activity integration.

Figure 4B:
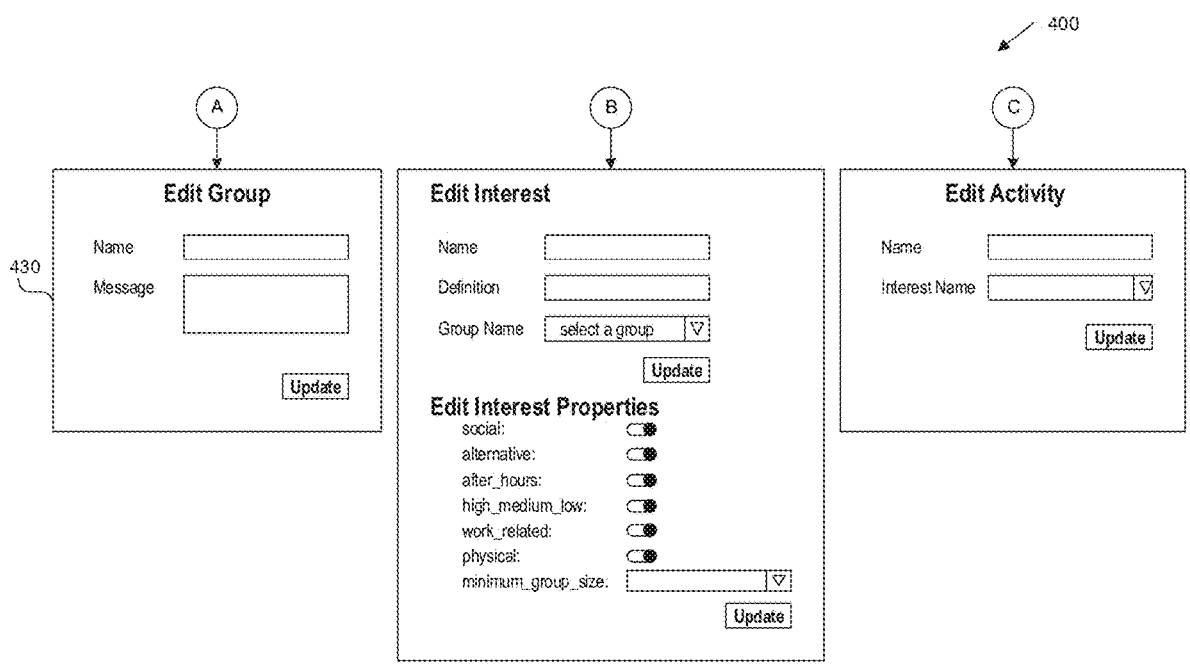

In FIGS. 4A-4B, row 410 shows the groups 110, interests 120, and activities 130. Row 420 shows an element 115 in the groups 110, such as physical, an element 125 in the interests 120, such as foodies, and an element 135 in the activities 130, such as camp fires. Row 430 shows how to edit groups 110, interests 120, and activities 130. For example, to edit interests 120, the user can specify attributes of the interest, such as whether the interest is social, alternative, after hours, work-related, physical, high_medium_low, and what is the minimum group size. "High, medium, and low" indicates the interest level for a particular activity. For example, a person who is a runner can have a high, a medium, or a low interest in a running event, such as a marathon. For example, if the person is a casual runner, the person's interest level for the marathon is low. If the person participates in the occasional 5K or 10K run, the person's interest level for the marathon is medium, while if the person runs marathons frequently, the person's interest level in the marathon is high.

FIG. 5 shows how to create a new group, new interest, or new activity in the system. In step 500, when the user creates a new group, the system requests the name for the new group and a message for the new group. The message is a description of the interest for ontological classification and placement. In step 510, the user can create a new interest. The system requests the name, the definition, and the group to which the new interest belongs. In addition, the system requests an indication of whether the interest is social, alternative, after hours, work-related, physical, high_medium_low, and what is the minimum group size. Minimum group size indicates the minimum number of participants for the interest to be viable. For example, if the interest is ping-pong, the minimum group size is two because ping-pong requires at least two participants. In step 520, the user can add activities. The system can receive a specification of activities as batches, reading from CSV files that adhere to a standard format. Alternatively, activities can be added one at a time by selecting an interest from the drop-down menu and adding the name of the activity.

Figure 6:
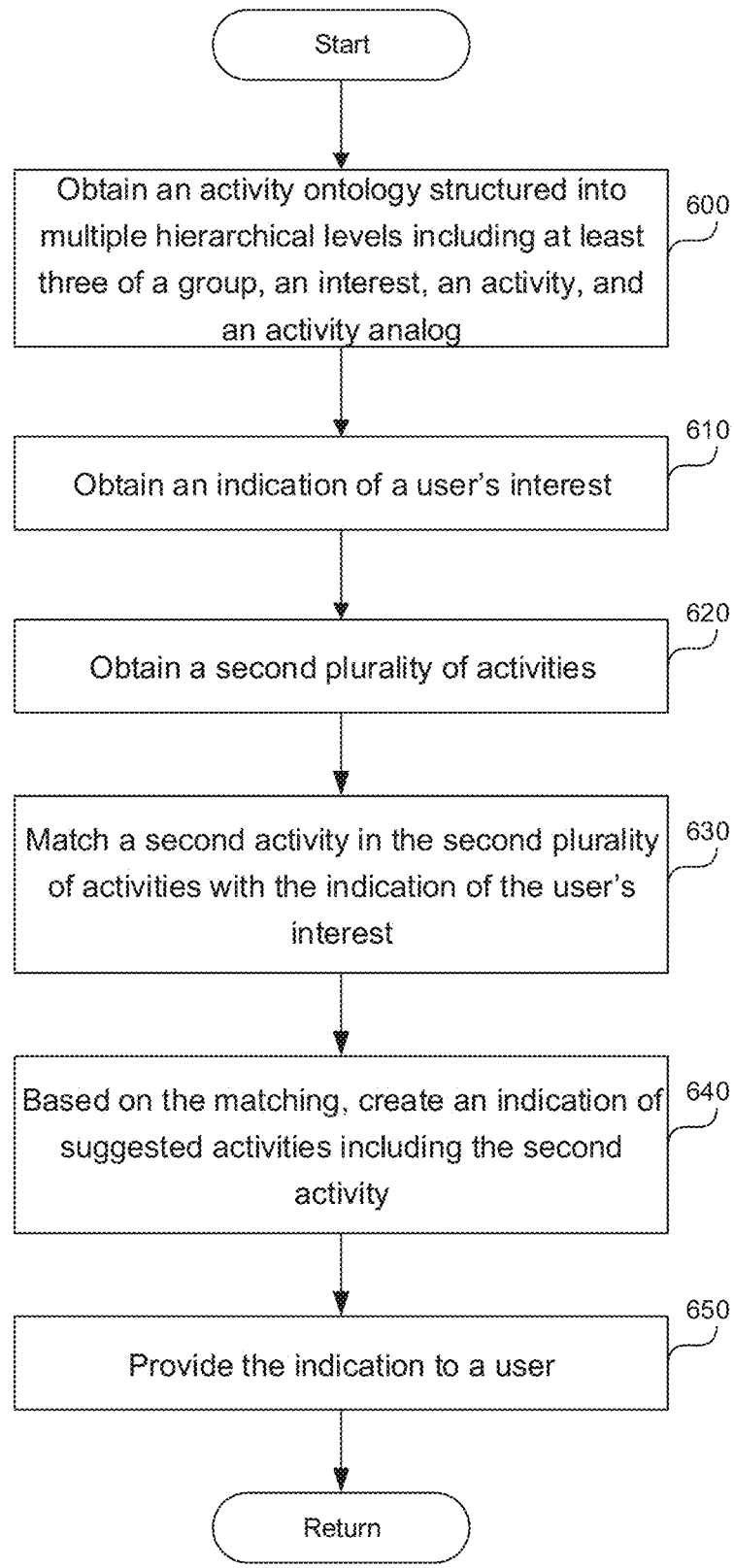
FIG. 6 is a flowchart of a method to provide an event feed to a user.

FIG. 6 is a flowchart of a method to provide an event feed to a user. An event feed is a collection of prospective activities. In block 600, a hardware or software processor executing instructions described in this application can obtain an activity ontology structured into multiple hierarchical levels, including at least three of: a group, an interest, an activity, and an activity analog. The names of the level's group, interest, activity, and activity analog can vary and can also be first level, second level, third level, and fourth level, respectively. The first level (i.e., the group), can include multiple interests. The second level (i.e., the interest), can include multiple activities. The third level (i.e., the activity), can include multiple activity analogs. The activity analogs can be the fourth level. The activity analogs can include a semantic equivalent of the activity and can vary based on a geographical location of the user. For example, the processor can adjust the activity analog associated with the activity based on pronunciation, spelling, or dialect associated with the geographical location associated with the user, either automatically or by receiving input from the user. Specifically, the activity "bike culture parties" can include "polar bears" as an activity analog.

In block 610, the processor can obtain an indication of a user's interest, such as "board games," "animals/pets," "crafting," "fashion," "religion," "swimming," etc. In block 620, the processor can obtain a second set of multiple activities, where the second set of multiple activities is specified by one or more users of the activity ontology, or is obtained from another platform, such as Facebook, Eventbrite, Songkick, or Meetup.

In block 630, the processor can identify activities relevant to the user. The processor can match a second activity in the second set of multiple activities with the indication of the user's interest by determining a second interest to which the second activity belongs and determining that the second interest matches the indication of the user's interest. For example, the processor can obtain the second set of multiple activities. The second set of activities can be from another platform where activities in another platform do not correspond to activities in the activity ontology. Alternatively, the second set of activities can be from the same platform but can be from a different geographical region and contain different activity names that denote the same activity but which differ due to regional dialect differences. The processor can map each activity in the second set of multiple activities to a corresponding activity analog in the activity ontology. To create the mapping, the processor can map based on the name of the activity in the activity ontology, or the activity from another platform can contain a tag indicating a corresponding activity or activity analog in the activity ontology. Based on the activity analog, the processor can map each activity in the second set of multiple activities to a corresponding interest. Finally, the processor can match the user's interest to the corresponding interest.

The processor matches the second activity, which is the third level of the hierarchy, to a corresponding interest, which is the second level of the hierarchy, and then matches the user's interests to the corresponding interests. By mapping an activity to an interest and then matching the interests at the second level of the activity ontology, more events become relevant to a particular user, but not too many events as compared to mapping to the first level of the activity ontology.

The benefit of matching at the second level of the hierarchy is explained below. For example, an event in the second set of multiple events contains "calligraphy." The user has selected "Book Lovers" as an interest, but has never attended a calligraphy event. If the processor was just matching the activities associated with the user to "calligraphy," the processor would not suggest the calligraphy event to the user. However, in the present case the processor matches the "calligraphy" event to its corresponding interest category, namely, "Book Lovers." Consequently, because the user has selected "Book Lovers" as an interest, the processor adds the calligraphy event to the user's event feed. That way, the user has a broader content of relevant events in the event feed.

By contrast, if the processor matches the calligraphy event to the first level of the hierarchy (i.e., group), "calligraphy" would map to the group "culture," which includes a broad range of interests, such as "technology." Consequently, the processor would suggest the calligraphy event to a user who has selected technology as an interest and who is, for example, interested in the Java programming language. As a result, the user's event feed would be cluttered with irrelevant and uninteresting events. Therefore, to create a list of relevant activities that is not too cluttered, the processor matches an activity (i.e., event), to the second level of the hierarchy, namely interest, and then matches the interest to the user's interest.

In block 640, based on the matching, the processor can create an indication of suggested activities, including the second activity. The indication of suggested activities can be the event feed. In block 650, the processor can provide the indication to a user. The indication can be a list and/or a multimedia presentation of the activities, such as an audio presentation and/or a video presentation. For example, upon determining that the second interest matches the indication of the user's interest, the processor can create a list of suggested activities, including the second activity.

The processor can facilitate meetings with friends, whether online or at a geographical location. The processor can obtain multiple friends associated with the user. A friend is a person designated as a friend within the platform. The processor can receive an indication, including a period of time when the user is available, and an indication of a location where the user is available. The location can be a geographical location or a location on the Internet. The processor can generate a notification associated with a friend among the multiple friends, where the notification indicates the period of time when the user is available, the indication of the location where the user is available, and an acceptance indicator that, when selected, indicates that the friend receiving the notification is available during the period of time and at the location. The processor can receive a selection of the acceptance indicator, and upon receiving the selection, the processor can enable creation of an activity indicating that the friend and the user are together.

The processor can generate a timer associated with the notification, where the timer can indicate when the notification expires. The processor can automatically generate the timer to expire a predetermined amount of time before the event starts. For example, the processor can calculate the distance between the user's current location and the location of the event, and determine how much time needs to be spent in transportation (e.g., T). The processor can set the timer to expire at the start of the event end minus T. Alternatively, the processor can set the timer to expire after some percentage of time has passed during the period of time when the user is available. For example, the processor can set the timer to expire after 50% of the period of time the user is available has passed. The processor can determine whether the timer has expired and whether a selection of the acceptance indicator has been received. Upon determining that the timer has expired and that the selection of the acceptance indicator has not been received, the processor can withdraw the notification from the event feed of the user's friends.

The processor can enable the user to expand the user's friend group. For example, the processor can receive an indication of an activity that the user is interested in among the list of suggested activities. Based on the indication, the processor can provide a list of attendees associated with the activity to the user. The processor can enable the user to select one or more attendees in the list of attendees to add to the multiple friends (i.e., the user's friend group). Based on the selection, the processor can add the one or more attendees to the multiple friends associated with the user.

The processor can enable the user to select a group of users who can view the user-created activity. The processor can create a second activity and select multiple users who have access to the second activity. The multiple users can include a subset of multiple friends associated with the user or all users associated with the activity ontology.

The processor can provide a functionality to add, delete, and edit each level of the activity ontology. In addition, the processor can automatically add, delete, and edit each level of the activity ontology. For example, if a particular category at the first, second, third, or fourth level of the activity ontology is not used, the processor can automatically delete the category. In another example, the processor can perform data mining of the events existing on other platforms on the Internet and can use artificial intelligence to extract relevant event categories. The processor can add the event categories to the list of activities in the activity ontology.

Figure 7:
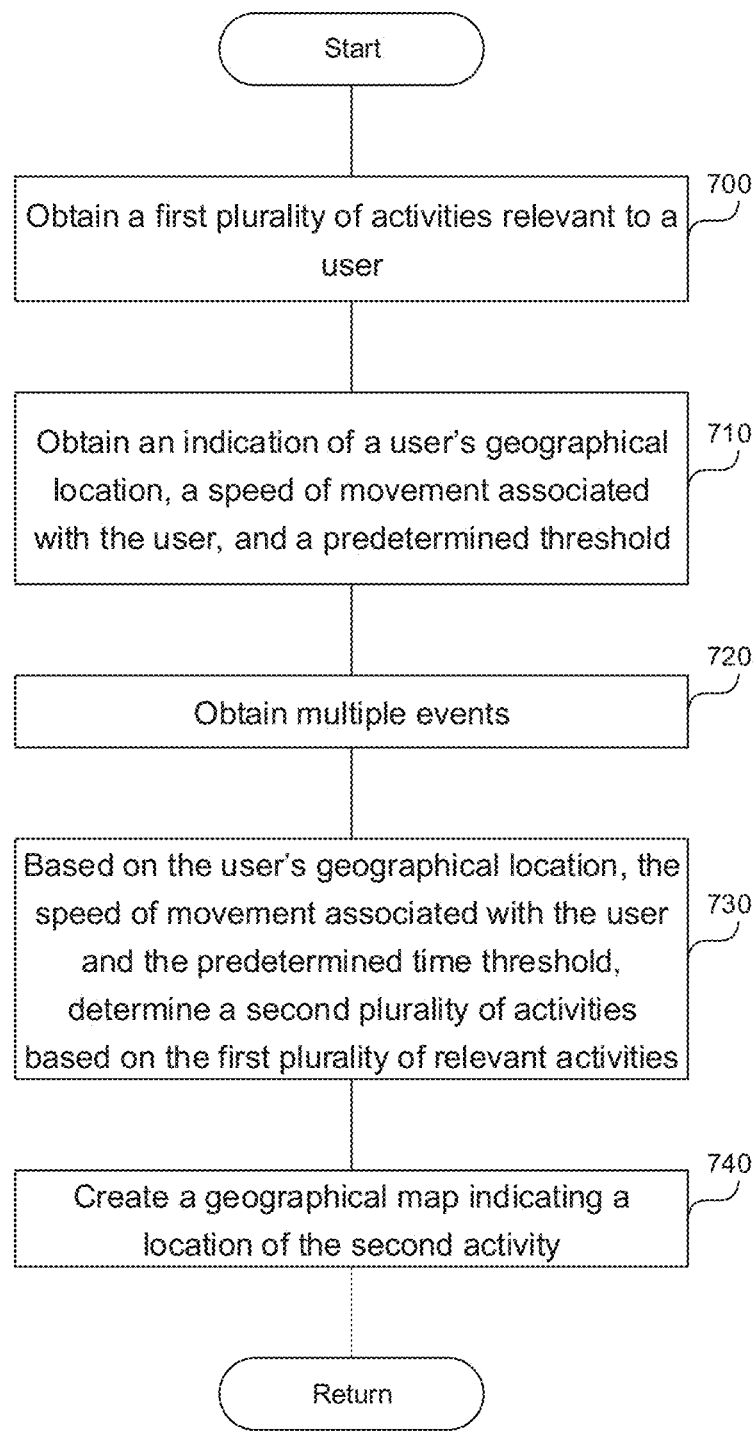
FIG. 7 is a flowchart of a method to present events of interest to a user on a geographical map.

FIG. 7 is a flowchart of a method to present events of interest to a user on a map. The disclosed system and method provide a web and mobile platform that enables users to seamlessly find events in which they are interested, and coordinate attending those events with people they want. In service of providing users with curated events around them, maps 810, 820 in FIGS. 8A-8B allow for easy exploration of events pertinent to user interest and in close proximity at the time of decision making.

According to market research, a map of close-by events curated by the user interests does not exist on any other platform. Everything the user sees on their map of events around them is something that the user has indicated to the system, either directly or indirectly, that the user is interested in attending.

In step 700, a hardware or software processor executing the instructions described in this application can obtain activities relevant to a user. The processor can obtain the activities relevant to the user from the user, by having the user, for example, select the activities of interest, or the interests which are the supergroup of activities in the activity ontology 100 in FIG. 1. The user can perform this selection when the user enrolls. Additionally, the user can modify the selected interests by adding or removing interests. The user can reset all the interests at any one point and create a new list of interests.

The processor can also automatically determine activities relevant to the user. In one example, the processor can use a hierarchical activity ontology 100 to determine activities relevant to the user. The processor can obtain an activity ontology 100 structured into multiple hierarchical levels, including at least three of a group, an interest, an activity, and an activity analog. The group can include multiple interests, the interest can include multiple activities, the activity can include multiple activity analogs, and the activity analog can include a semantic equivalent of the activity. The processor can obtain an indication of a user's interest associated with the interest in the activity ontology 100. For example, the user can specify that an interest in the activity ontology 100 is relevant to the user.

In another example, the processor can determine adjacent activities, namely, activities that the user did not specify as interesting, but that the user is likely to be interested in. The processor can utilize machine learning/artificial intelligence to determine adjacent activities. The processor can obtain an activity relevant to the user. The processor can obtain multiple activities relevant to a second user, where the multiple activities relevant to the second user include the activity relevant to the user. The processor can determine an adjacent activity associated with the user by determining the adjacent activity among the multiple activities relevant to the second user, where the adjacent activity is not included in the multiple activities relevant to the user. The processor can add the adjacent activity to the first plurality of activities relevant to the user.

In a third example, the processor can obtain a current time of day, a current day of a week, and a history of locations associated with the user. Based on the current time of day, the current day of the week, and the history of locations associated with the user, the processor can determine an activity of interest to the user. For example, history locations associated with the user can indicate that on Sunday morning the user tends to go to yoga. The user can also indicate that the user is interested in both coffee and yoga. The current time of day and day of week can indicate that it is Sunday morning. Based on the current time of day and day of the week, the system can suggest yoga, instead of coffee. Alternatively, the system can suggest both yoga and coffee, but adjust the rendering of the yoga event icon to be more prominent than the coffee event icon on the geographical map.

In step 710 the processor can obtain an indication of a user's geographical location, and a predetermined threshold indicating a distance between the user and a particular activity. The predetermined threshold can be specified in terms of distance, time or map area visible to user on a screen. If the predetermined threshold is specified in terms of distance, the processor can display the events within the specified distance of the user's current geographical location. If the predetermined threshold is specified in terms of map area visible to the user on a screen, the processor can display the events that are associated with the locations visible to the user on the screen.

If the predetermined threshold is specified in terms of time, the predetermined threshold can indicate a length of time, such as 5, 10, or 15 minutes. Consequently, each event that the processor displays is within the predetermined threshold, such as 5, 10, or 15 minutes away from the user. To find the events within the predetermined threshold, the processor can obtain a speed of movement associated with the user, and the predetermined threshold. Based on the user's geographical location, the speed of movement associated with the user and the predetermined threshold, the processor can calculate the perimeter of an area surrounding the user's current location which the user can reach within the predetermined threshold, such as 5, 10, or 15 minutes. The speed of movement of the user can be the current speed of movement or speed of movement averaged over a predetermined time window, such as 5, 10, or 15 minutes. The processor can determine the events that match the user's interests and satisfy the predetermined threshold, meaning, the processor displays the events that match the user's interests and are within the predetermined threshold away from the user's geographical location when the user moves at the speed of movement associated with the user.

In step 720, the processor can obtain multiple events, where an event among multiple events includes, or is tagged with, one or more activities. The one or more activities associated with the multiple events are included in the activities relevant to the user. Based on the user's geographical location, and the predetermined threshold, the processor can determine a second set of events based on the multiple events. The second set of multiple events is at least a subset of the multiple events, and a second, pertinent event among the second set of multiple events is within the predetermined threshold away from the user's geographical location.

To obtain multiple events where one or more activities associated with multiple events are part of the activities relevant to the user, the processor can obtain multiple events specified by one or more users of the activity ontology 100, or obtained from another platform. The processor can determine an activity associated with events, and an interest to which the activity belongs. The processor can determine whether the interest matches the indication of the user's interest. Upon determining that the interest matches the indication of the user's interests, the processor can add the matching events to the multiple events relevant to the user. Therefore, the processor can match an activity among the multiple activities with the indication of the user's interest, thereby identifying the multiple activities relevant to the user.

In step 730, the processor can create a geographical map indicating a location of the second event. To create the geographical map the processor can adjust an indication of the location of the second event based on an interest associated with the second event. For example, each event can have one or more activities that describe the event, where the activities are part of the activity ontology 100. The activities have a corresponding interest in the activity ontology 100. Each interest can have a corresponding icon. For example, activities associated with a food interest can have the same icon, including knife and fork, activities associated with coffee can have the same icon, including a cup, activities associated with arts and crafts can have scissors as an icon, etc. In another example, each activity can have a special icon, and the event can be represented using an icon of one of the activities associated with the event.

The processor can provide a preview of an event prior to the user committing to attend the event. The processor can receive a selection of the second event associated with the geographical map. The processor can provide details associated with the selected event including event description, event location, event date, event time, event activities, and event attendees, as described in FIG. 10. The processor can adjust an icon indicating the location of the second event to distinguish the second event from an unselected event. The processor can enable the user to remove the details associated with the selected event from a display.

The processor can enable the user to specify a time window within which the events of interest need to occur. The processor can provide the geographical map, including the indication of the second event and a user interface configured to receive an indication of time, as described in FIGS. 11A-11B. The user interface configured to receive indication of time can be a calendar. The processor can receive the indication of time from a user. The processor can determine one or more events occurring within the indicated time, and can create the geographical map, including the one or more events.

The processor can enable the user to specify a description associated with an activity of interest. The processor can provide a selection functionality associated with the geographical map. The processor can receive an input indicating a user preference, such as a description associated with a particular activity. The description of the activity can be an activity analog, an interest, a natural language description of the activity, or a search word contained in the activity. The description can also include an indication of time, such as date and/or time, during which the event should occur. Based on the user preference, the processor can select the second event among the second set of multiple events, where the second event satisfies the user preference. The processor can create the geographical map, including the indication of the second event.

In addition to events, the processor can also display the geographical map availability of the user to other users who are friends of the user. The processor can obtain multiple friends associated with the user. The processor can receive an indication, including a period of time when the user is available, and an indication of a location where the user is available. The processor can create the geographical map indicating the location where the user is available. The processor can render the location of the available user using special shading, as shown in FIG. 11B. If the period of time when the user is available falls within the date selected by the user's friend, the processor can render the location of the user using special shading. The processor can also indicate a period of time during which the user is available on the geographical map.

Figure 8A:
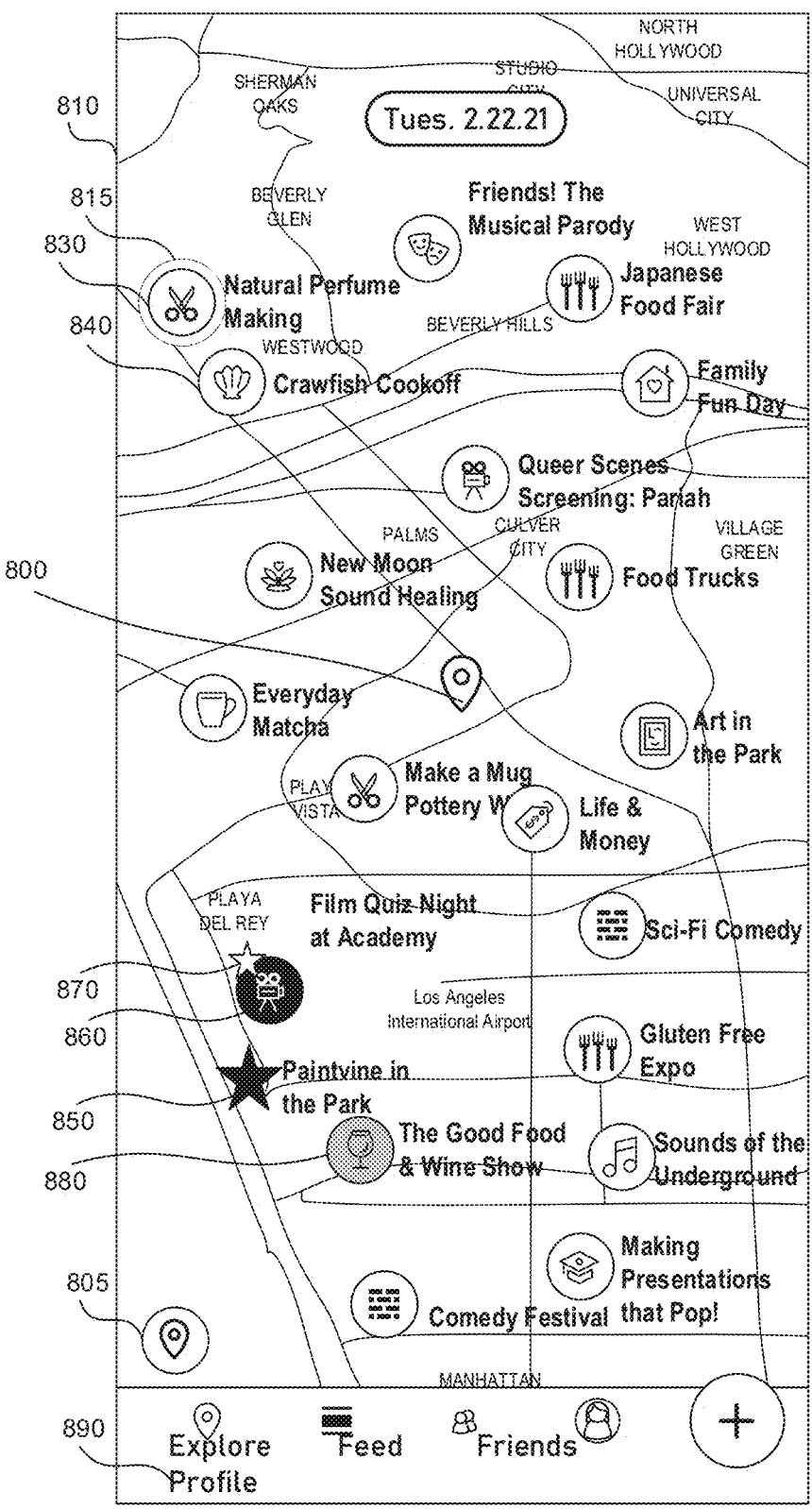
FIGS. 8A-8B show a map displaying events of interest.
Figure 8B:
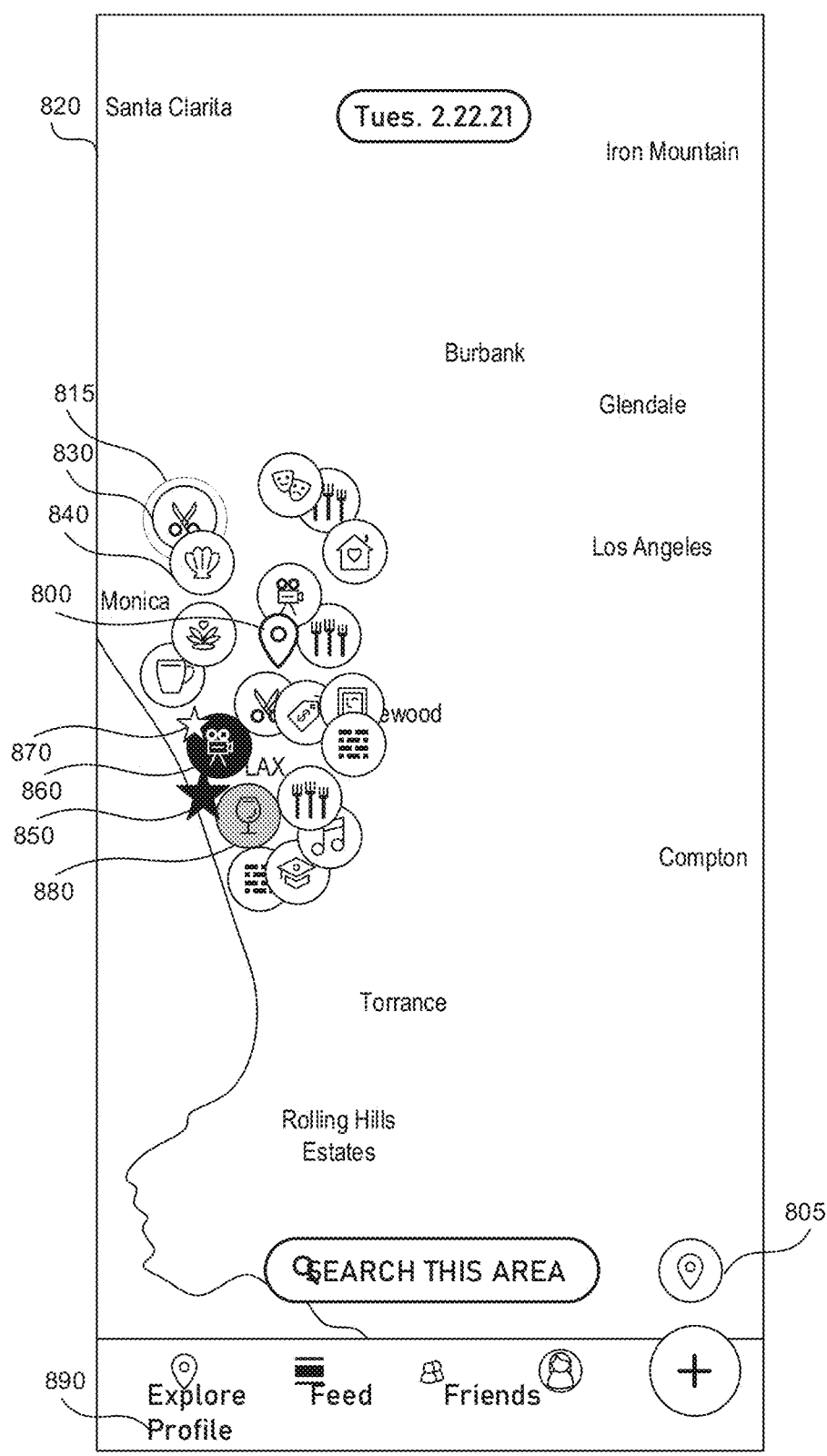

FIGS. 8A-8B show a map displaying events of interest. The maps 810, 820 can exist within an "explore" tab 890 of the user interface. The explore tab 890 allows users to explore all public/joinable events happening in the system via a map user interface.

Qualitative research, including concept testing and user research interviews, indicates that the map provides significant value to all users. Further, the qualitative research indicates proximity to events is one of the highest predictive indicators as to whether a user will attend an event. In prediction value, the proximity to events is second only to whether the user has friends that are going. The explore tab 890 provides proximity information as well as attendance information and is in perhaps one of the most information-dense views for a user. Additionally, many users have reported how helpful the maps 810, 820 are when traveling to new destinations, and as COVID has been on the decline, travel, vacation rentals, and hotel bookings have significantly been increasing, presenting a unique opportunity to aid the users' willingness to explore new destinations and things to do. The disclosed system and method can provide a utility to travelers very much in the same vein as Google Maps and Uber/Lyft. Even though these applications are not exclusively "travel" or "tourism" applications, these applications are relied upon by those who are traveling and exploring a new destination.

The icon 800 shows the location of the user. To show the location of the user, the user device needs to enable global positioning system (GPS). If the user has not enabled GPS, the icon 800 is the center coordinates of a region that the user has indicated represents the user's position.

The map 810, 820 allows the user to pan, zoom in, and zoom out. In one embodiment, zooming in and out of the map and panning does not change the events 830, 840, 850, 860, 880 visible to the user because the events visible to the user are determined by the user's location and the predetermined threshold. In another embodiment, zooming in and out of the map and panning can change the events 830, 840, 850, 860, 880 visible to the user because the system can display the events visible in the region of the map 810, 820 that is currently visible to the user. The user can easily re-center to the user's location after zooming and panning around the map, by selecting the re-center icon 805.

A user can see all events that are happening in the platform within the predetermined threshold in the maps 810, 820. As explained above, the predetermined threshold can be how far away the event is from the user's current location timewise, distance wise, or how much the user has zoomed in or out of the maps 810, 820. If the predetermined threshold is how far away the event is from the user's current location timewise or distance wise, the zoom in or out of the maps or panning 810, 820 does not affect the number of events shown, as seen in FIGS. 8A-8B.

The map 810, 820 can display a predetermined number of public/joinable events that are happening today but which have not yet happened. If the user has not specified interests associated with the activity ontology 100 in FIG. 1, the map 810, 820 can show all events across all interests with a start time of "Today". The system can also display a maximum number of events, such as 100 events. Once the user leaves the map 810, 820, the system can save preferences and filters the user has specified, and can reload the preferences and filters next time the user returns.

A user can quickly scan for events in which the user is interested through the use of interest iconography. For example, every event 830, 840, 850, 860, 880 (only five labeled for brevity) has a distinct icon that indicates an interest associated with the event 830, 840, 850, 860, 880. The event 830, 840, 850, 860, 880 can be tagged with one or more activities describing the type of event. Each activity associated with the event 830, 840, 850, 860, 880 has a corresponding interest in the activity ontology 100. Each interest has a corresponding icon in the map 810, 820. Consequently, each event 830, 840, 850, 860, 880 is represented using the interest icon associated with the first activity with which the event is tagged. If the event 830, 840, 850, 860, 880 has zero activities, by, for example, being updated to remove previously tagged activities, the icon defaults to the "star" interest icon 850.

A user can distinguish between events 830, 840, 850, 860, 880 that the user has saved and the ones that the user has not saved through specialized rendering of icons. For example, the system can render a user's saved event 830 using a hollow iconography state and/or by adding an additional circle 815, to distinguish the saved event 830 from the unsaved event 840, 850, 860, 880, which is shaded in FIGS. 8A-8B.

A user can distinguish between promoted business events and events created by other users through specialized rendering of icons. For example, the system can render a promoted event 860 using a special color, such as black, and an additional star icon 870.

A user can preview the event 830, 840, 850, 860, 880 by selecting the event, such as by tapping on the event. When the user selects the events 830, 840, 850, 860, 880, the system can display to the user the event details page, including relevant event details, such as event description, event location, event date/time, event activities, and/or event attendees. The system can enable the user to go back from the event details view to the map 810, 820 by making an appropriate selection, such as selecting an appropriate icon (e.g. a "back" button).

For the events 830, 840, 850, 860, 880 on the map 810, 820 that are being previewed, the system can display the "active" iconography treatment to denote the previewed event from everything else. The "active" iconography treatments can include special rendering of the events 830, 840, 850, 860, 880 icons in a predetermined way, such as by enlarging the events, color coding the event icon, etc. The system can distinguish events that the user has previewed from those that the user has not yet previewed through color coding the previewed events, such as coloring the previewed gray as can be seen in event icon 880.

Figure 9:
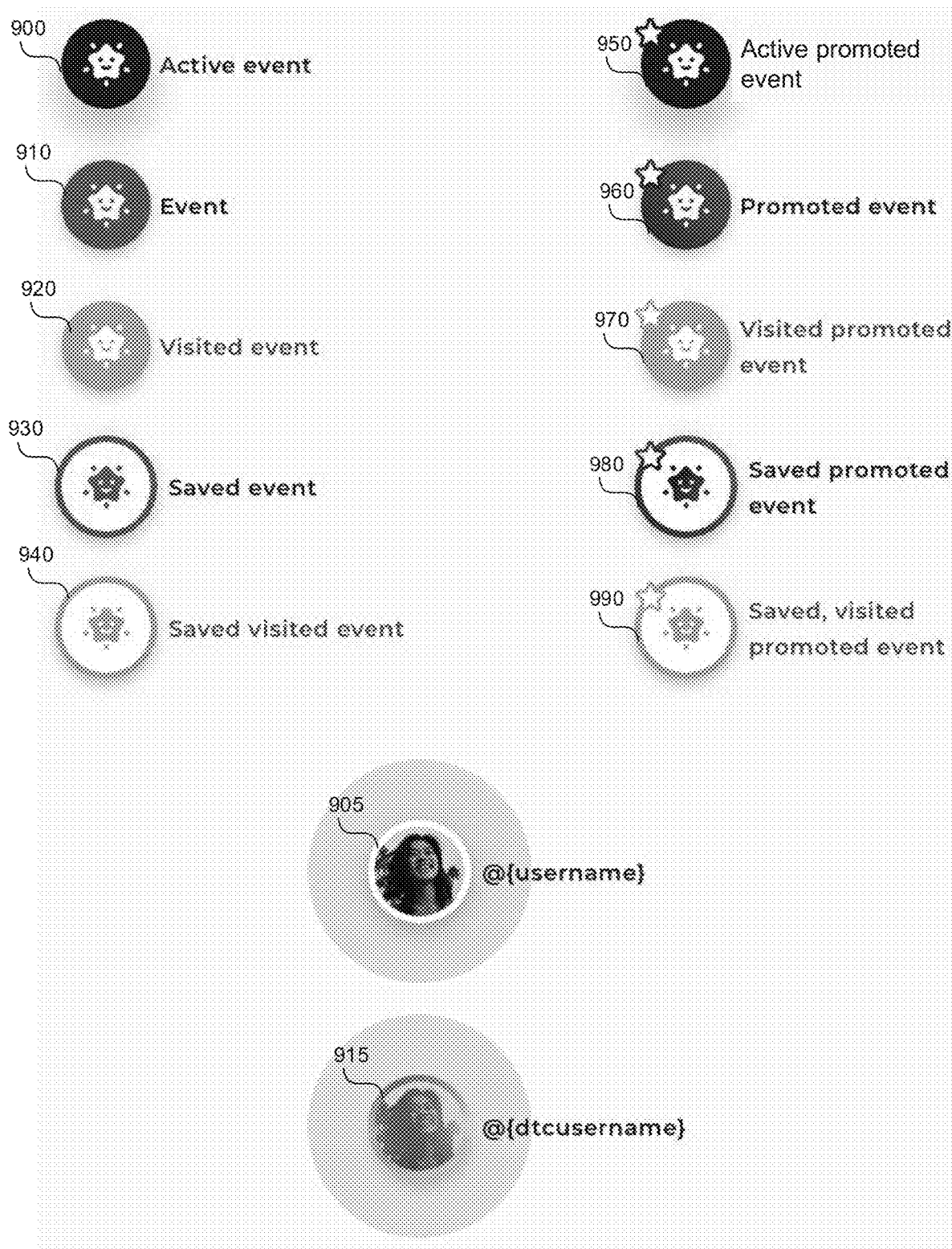
FIG. 9 shows icons used for various events.

FIG. 9 shows icons used for various events. The icons 900, 910, 920, 930, 940, 950, 960, 970, 980, 990, 905, 915 are rendered in different ways visually indicating a state of an event 830, 840, 850, 860, 880 in FIGS. 8A, 8B. The state of an event can be described using a hierarchy of statuses, including a first level status, second level status, and third level status. The first level status includes an event. The first level status can indicate the state of the event. A second level status can include active, visited, saved, promoted. The first level status and the second level status can be combined into states, including: active event, visited event, saved event, promoted event. The first level status, the second level status, and a third level status can be combined into states, including: saved visited event, active promoted event, promoted event, visited promoted event, saved promoted event, and saved visited promoted event.

Each status in the hierarchy can have a corresponding visual representation, which in turn can be combined to visually indicate the state of the events 830, 840, 850, 860, 880. For example, an event corresponds to the icon 910.

The "active" second level status has a corresponding visual representation 900 which can be a particular color, such as black, different from the color of the event icon 910. The "visited" second level status has a corresponding visual representation 930 which can be a particular color, such as gray, different from both the color of the event icon 910 and the color of the active status. The "saved" second level status has a corresponding visual representation 940, which can be a colored circle around the event icon 910. The "promoted" second level status has a corresponding visual representation 960 which can be a special object, such as a star, added to the perimeter of the event icon 910. In addition, the "promoted" second level status can be color-coded, such as by adding a particular color shading to the event icon 910. The color of the special object can match the color coding of the icon.

The "save visited event" third level status has a corresponding visual representation 940, which is a combination of the "saved" visual representation and "visited" visual representation. Namely, the "saved visited event" is color-coded to match the color of the "saved" visual representation and has a circle around the event icon. The color of the circle corresponds to the color of the "saved" visual representation.

The "active promoted event" third level status has a corresponding visual representation 950, which is a combination of the "active" visual representation and "promoted" visual representation. Namely, the "active promoted event" is color-coded to match the color of the "active" visual representation and has the special object indicating that the event is promoted.

The "visited promoted event" third level status has a corresponding visual representation 970, which is a combination of the "visited" visual representation and "promoted" visual representation. Namely, the "visited promoted event" is color-coded to match the color of the "visited" visual representation, and has the special object indicating that the event is promoted.

The "saved promoted event" third level status has a corresponding representation 980, which is a combination of "saved" visual representation and "promoted" visual representation. Namely, the "saved promoted event" has a circle around the event icon 910, and the special object indicating that the event is promoted. The "saved promoted event" can also have the particular shading indicating that the event is promoted.

The "saved visited promoted event" third level status has a corresponding representation 990, which is a combination of "saved" visual representation, "visited" visual representation, and "promoted" visual representation. Namely, "saved visited promoted event" has a circle around the event icon 910, is color-coded to reduce corresponding to the "visited" visual representation, and has the special object indicating that the event is promoted.

In addition, icons 905 and 915 represent user's friends. The icons 905, 915 can include an image of the user's friend. Icon 915 is color-coded to indicate that the user represented by the icon 915 is available as explained in step 305 in FIG. 3. The icon 915 can be color-coded to indicate availability if the user's friend associated with the icon 915 is available any time within a date specified by the user. The date can be the current date or some date in the future.

Figure 10:
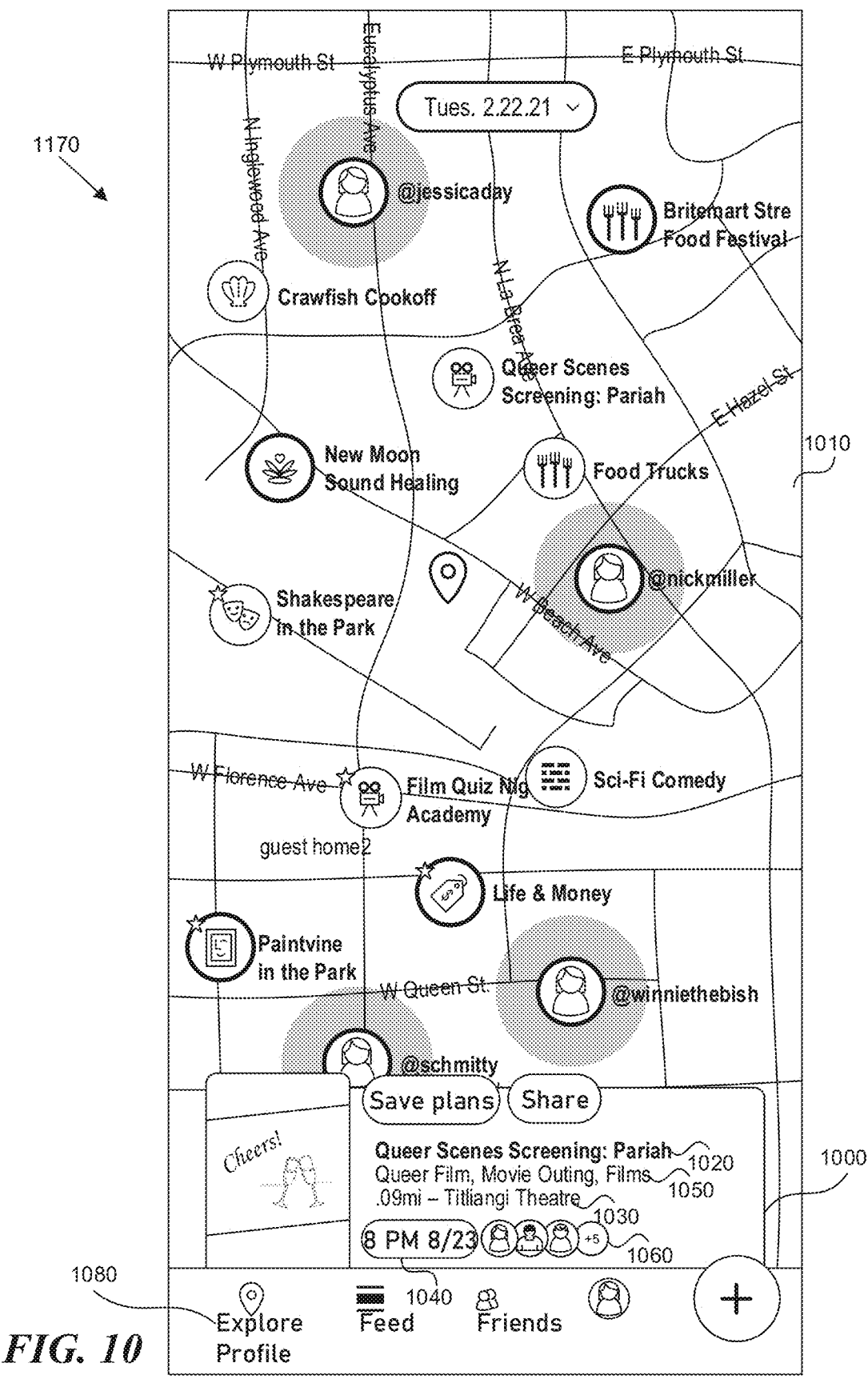
FIG. 10 shows an event details page.

FIG. 10 shows an event details page. The user interface 1070 can display the event details page 1000 with the geographical map 1010. The event details page 1000 can include event description 1020, event location 1030, event date/time 1040, activities associated with the event 1050, and attendees 1060. The user can exit viewing the event details page 1000 by selecting any point on the geographical map 1010, or by selecting a different functionality of the user interface 1070, such as the explore tab 1080.

Figure 11A:
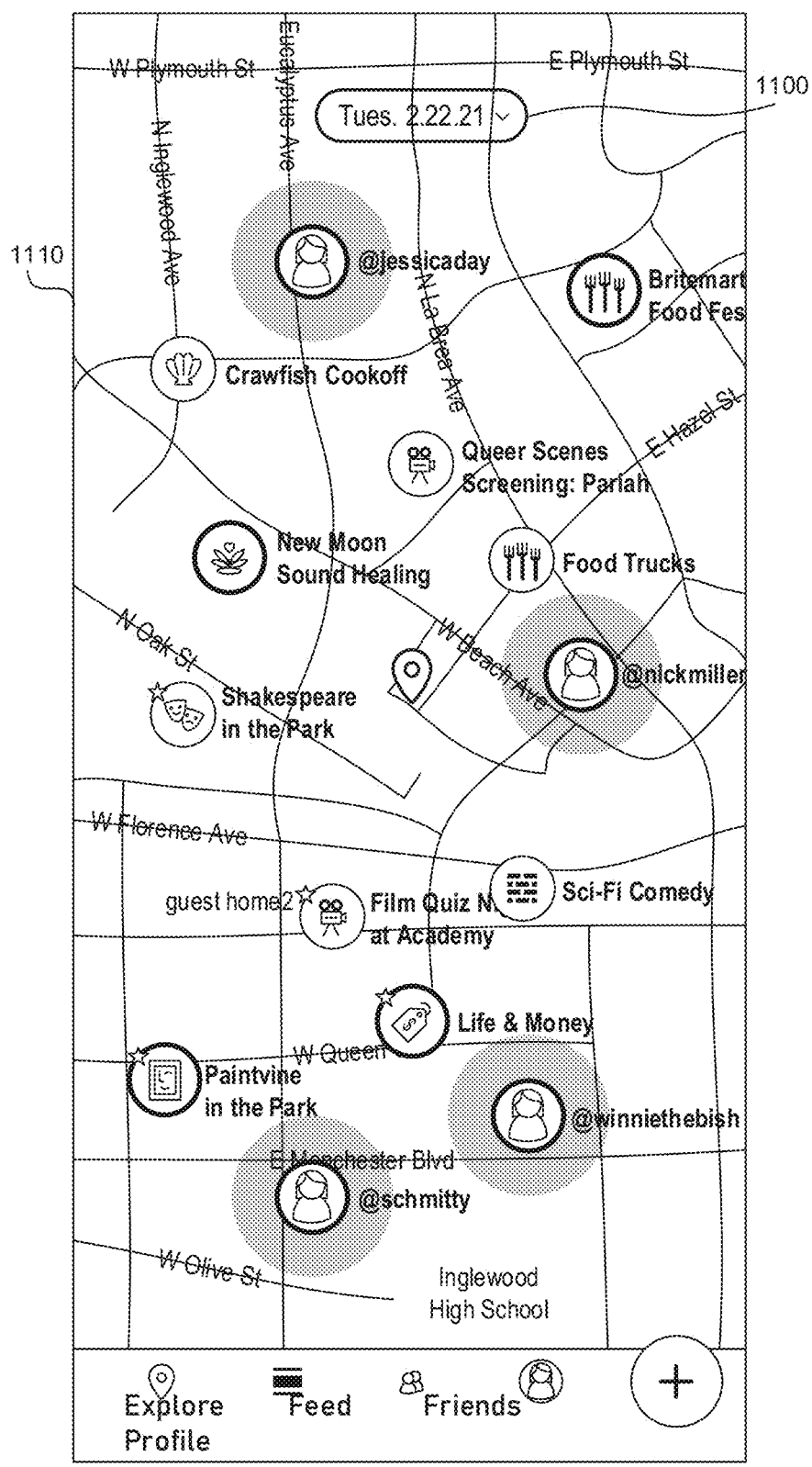
FIGS. 11A-11B show the user interface enabling a user to filter events by date and time.
Figure 11B:
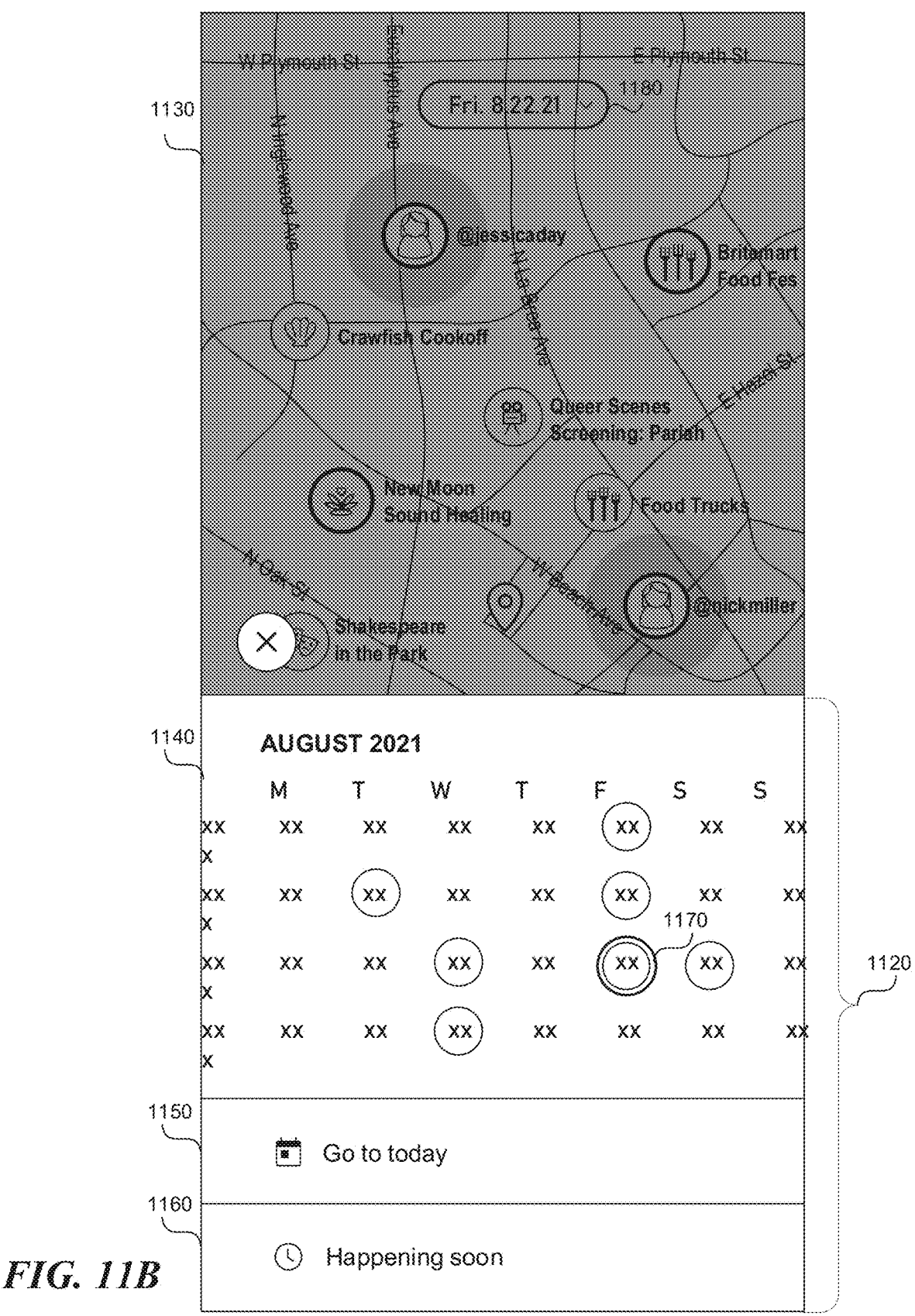

FIGS. 11A-11B show the user interface enabling a user to filter events by date and time. A user can filter the events by a specific date. FIG. 11A shows a default filter 1100, namely, the default date superimposed on a geographical map 1110. The system applies the default filter 1100 if the user does not make a date selection. The default filter 1100 is today's date. Date formatting of the default filter 1100 depends on the device locale, for example, 2.22.21 in the United States vs. 22.2.21 in Europe.

Filtering by a specific date shows events that have a run time that occurs anytime within the specific date contained in the filter. For example, a user may filter for events on Feb. 22, 2021. An event may start on Feb. 21, 2022 at 11:00 p.m. and run through Feb. 22, 2021 at 4:00 a.m. Even though the start time of the event is before the user selected date, the system still displays the event when the filter is Feb. 22, 2021.

FIG. 11B shows a date picker 1120 superimposed on a geographical map 1130. The date picker 1120 can include a calendar widget 1140, "Go to today" filter 1150, and "Happening soon" widget 1160. The calendar widget 1140 can allow the user to select a date 1170. The calendar widget 1140 can update the display to show the date 1170 user selected, such as by adding an additional circle as shown in FIG. 11B. Upon selection, the calendar widget 1140 can show the date selected 1170 in the user interface element 1180. Based on the selected date, the system can display events occurring on the selected date.

The next time the user opens the date picker 1120, the system can display events occurring on the selected date. In addition, the system can provide a "Go to today" filter 1150 allowing the user to view the events that are happening on the current day.

Selecting the "Happening soon" widget 1160 can show events that are happening now or starting within a predetermined period of time, such as the next four hours. Once the user selects "Happening soon" widget 1160, the system updates the geographical map 1130 to show events that are happening soon. The next time the user opens the date picker 1120, the system can display events that were displayed when "Happening soon" was selected. In addition, the system can provide a "Go to today" filter 1150 allowing the user to view the events that are happening on the current day.

Computer System

Figure 12:
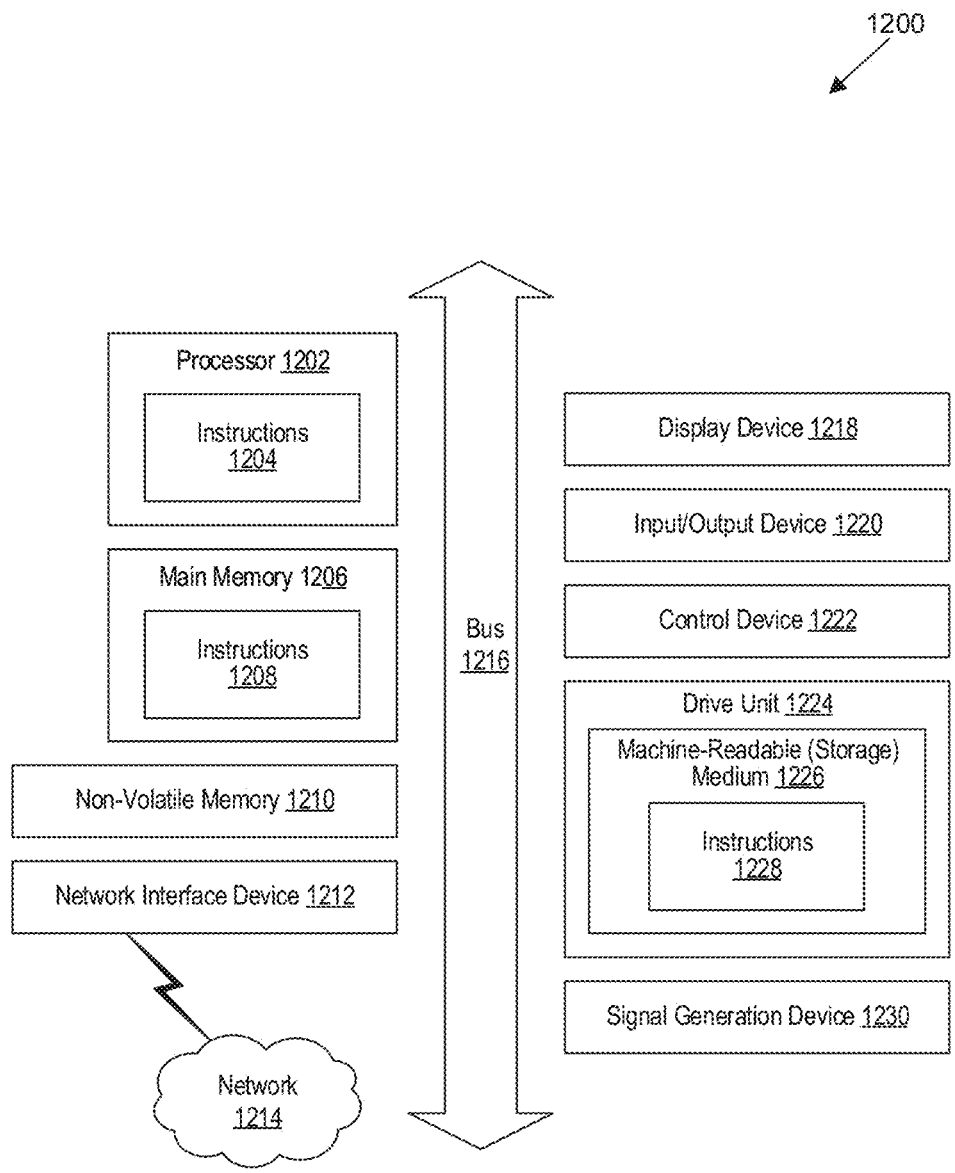
FIG. 12 is a block diagram that illustrates an example of a computer system 700 in which at least some operations described herein can be implemented.

FIG. 12 is a block diagram that illustrates an example of a computer system 1200 in which at least some operations described herein can be implemented. As shown, the computer system 1200 can include: one or more processors 1202, main memory 1206, non-volatile memory 1210, a network interface device 1212, video display device 1218, an input/output device 1220, a control device 1222 (e.g., keyboard and pointing device), a drive unit 1224 that includes a storage medium 1226, and a signal generation device 1230, that are communicatively connected to a bus 1216. The bus 1216 represents one or more physical buses and/or point-to-point connections that are connected by appropriate bridges, adapters, or controllers. Various common components (e.g., cache memory) are omitted from FIG. 12 for brevity. Instead, the computer system 1200 is intended to illustrate a hardware device on which components illustrated or described (relative to the examples of the figures) and any other components described in this specification can be implemented.

The computer system 1200 can take any suitable physical form. For example, the computing system 1200 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 1200. In some implementation, the computer system 1200 can be an embedded computer system, a system-on-chip (SOC), a single-board computer system (SBC), or a distributed system, such as a mesh of computer systems, or include one or more cloud components in one or more networks. Where appropriate, one or more computer systems 1200 can perform operations in real-time, near real-time, or in batch mode.

The network interface device 1212 enables the computing system 1200 to mediate data in a network 1214 with an entity that is external to the computing system 1200 through any communication protocol supported by the computing system 1200 and the external entity. Examples of the network interface device 1212 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 1206, non-volatile memory 1210, machine-readable medium 1226) can be local, remote, or distributed. Although shown as a single medium, the machine-readable medium 1226 can include multiple media (e.g., a centralized/distributed database and/or associated caches and servers) that store one or more sets of instructions 1228. The machine-readable (storage) medium 1226 can include any medium that is capable of storing, encoding, or carrying a set of instructions for execution by the computing system 1200. The machine-readable medium 1226 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media, such as volatile and non-volatile memory devices 1210, removable flash memory, hard disk drives, optical disks, and transmission-type media, such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1204, 1208, 1228) set at various times in various memory and storage devices in computing device(s). When read and executed by the processor 1202, the instruction(s) cause the computing system 1200 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but not other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents, applications, and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A method comprising:
    obtaining, by a processor, an activity ontology structured into multiple hierarchical levels, including at least three of a group, an interest, an activity, and an activity analog,
        wherein the group includes a first plurality of interests,
        wherein the interest includes a first plurality of activities,
        wherein the activity includes a first plurality of activity analogs,
        wherein the activity analog includes a semantic equivalent of the activity;
    obtaining, by the processor, an indication of a user's interest,
        wherein the user's interest is associated with a user, and
        wherein the user's interest is associated with the first plurality of interests;
    obtaining, by the processor, a first plurality of events,
        wherein the first plurality of events is specified by one or more users of the activity ontology, or
        wherein the first plurality of events is obtained from another processor operating independently of the activity ontology, and
        wherein an event in the first plurality of events includes one or more activities;
    matching, by the processor, the event in the first plurality of events with the indication of the user's interest, thereby identifying relevant events, by:
        obtaining the one or more activities associated with the event;
        determining a second interest associated with the one or more activities;
        determining whether the second interest matches the indication of the user's interest; and
        upon determining that the second interest matches the indication of the user's interest, adding the event to the relevant events;
    obtaining, by the processor, an indication of a user's location, a speed of movement associated with the user, and a predetermined threshold indicating a length of time;
    determining, by the processor, a second plurality of events based on the relevant events, based on the user's location, the speed of movement associated with the user, and the predetermined threshold,
        wherein the second plurality of events is at least a subset of the first plurality of events,
        wherein a second event in the second plurality of events is within the predetermined threshold away from the user's location when the user moves at the speed of movement associated with the user; and
    creating, by the processor, a map indicating a location of the second event.

2. The method of claim 1, comprising:
    receiving, by the processor, a selection of the second event associated with the map;
    providing, by the processor, details associated with the second event, including attendees; and
    adjusting, by the processor, an icon indicating the location of the second event to distinguish the second event from an unselected event.

3. The method of claim 1, comprising:
    providing, by the processor, the map, including the indication of the second event and a user interface configured to receive an indication of time;
    receiving, by the processor, the indication of time from the user;
    determining, by the processor, one or more events associated with the indication of time; and
    creating, by the processor, the map, including the one or more events.

4. The method of claim 1, comprising:
    providing, by the processor, a selection functionality associated with the map;
    receiving, by the processor, an input indicating a user preference,
        wherein the user preference includes a description of a particular activity;
    selecting, by the processor, based on the user preference, the second event in the second plurality of events,
        wherein the second event satisfies the user preference; and
    creating, by the processor, the map, including the indication of the second event.

5. The method of claim 1, wherein obtaining the indication of the user's interest comprises:
    obtaining, by the processor, the indication of the user's interest from the user;
    obtaining, by the processor, a plurality of interests associated with a second user,
        wherein the second user shares the user's interest;
    determining, by the processor, an adjacent activity associated with the user by determining a particular activity in which the second user is interested; and
    adding, by the processor, the adjacent activity to the relevant events.

6. The method of claim 1, wherein obtaining the indication of the user's interest comprises:
    obtaining, by the processor, a current time of day, a current day of a week, and a history of locations associated with the user; and
    determining, by the processor, an activity of interest to the user, based on the current time of day, the current day of the week, and the history of locations associated with the user.

7. The method of claim 1, wherein creating the map comprises:
    adjusting, by the processor, an indication of the location of the second event based on an interest associated with the second event.

8. The method of claim 1, comprising:
    obtaining, by the processor, multiple friends associated with the user;
    receiving, by the processor, an indication, including a time when the user is available, and a location where the user is available; and
    creating by the processor, the map indicating the location where the user is available.

9. At least one non-transitory computer-readable storage medium, storing instructions, which, when executed by at least one data processor of a system, causes the system to:
    obtain a first plurality of activities relevant to a user;
    obtain an indication of a user's location, and a predetermined threshold indicating a distance between the user and a particular activity;
    obtain a first plurality of events,
        wherein an event in the first plurality of events includes one or more activities, and wherein the one or more activities associated with the first plurality of events are included in the first plurality of activities relevant to the user;
determine a second plurality of events based on the first plurality of events, the user's location, and the predetermined threshold,
 wherein the second plurality of events is at least a subset of the first plurality of events,
 wherein a second event in the second plurality of events is within the predetermined threshold away from the user's location;
create a map indicating a location of the second event;
receive an input indicating a user preference by receiving a selection of the second event associated with the map;
provide details associated with the second event, including attendees:
adjust an icon indicating the location of the second event to distinguish the second event from an unselected event; and
provide a user interface element enabling the user to remove the details associated with the second event from a display.

10. The non-transitory computer-readable storage medium of claim 9, wherein the instructions to obtain the first plurality of activities relevant to the user comprise instructions to:
obtain an activity ontology structured into multiple hierarchical levels, including at least three of a group, an interest, an activity, and an activity analog,
 wherein the group includes a second plurality of interests,
 wherein the interest includes a second plurality of activities,
 wherein the activity includes a second plurality of activity analogs,
 wherein the activity analog includes a semantic equivalent of the activity; and
obtain an indication of a user's interest associated with the second plurality of interests.

11. The non-transitory computer-readable storage medium of claim 9, wherein the instructions to obtain the first plurality of events comprise instructions to:
obtain a third plurality of events,
 wherein the third plurality of events is specified by one or more users of an activity ontology, or
 wherein the third plurality of events is obtained from another platform operating independently of the activity ontology; and
match a third event in the third plurality of events with an indication of a user's interest, thereby identifying the first plurality of events, by:
 obtaining the one or more activities associated with the third event in the third plurality of events;
 determining an interest associated with the one or more activities; and
 determining whether the interest matches the indication of the user's interest; and
 upon determining that the interest matches the indication of the user's interest, adding the third event to the first plurality of events.

12. The non-transitory computer-readable storage medium of claim 9, comprising instructions to:
provide a selection functionality associated with the map;
receive the input indicating the user preference,
 wherein the user preference includes a description associated with the particular activity;
 based on the user preference selecting the second event in the second plurality of events,
  wherein the second event satisfies the user preference; and
create the map, including the indication of the second event.

13. The non-transitory computer-readable storage medium of claim 9, comprising instructions to:
obtain a speed of movement associated with the user, and the predetermined threshold indicating a length of time; and
based on the user's location, the speed of movement associated with the user, and the predetermined threshold, determine the second plurality of events based on the first plurality of events,
 wherein the second event in the second plurality of events is within the predetermined threshold away from the user's location when the user moves at the speed of movement associated with the user.

14. The non-transitory computer-readable storage medium of claim 9, wherein the instructions to obtain the first plurality of activities relevant to the user comprise the instructions to:
obtain an activity relevant to the user;
obtain a plurality of activities relevant to a second user,
 wherein the plurality of activities relevant to the second user includes the activity relevant to the user;
determine an adjacent activity associated with the user by determining the adjacent activity in the plurality of activities relevant to the second user, and
 wherein the adjacent activity is not included in the first plurality of activities relevant to the user; and
add the adjacent activity to the first plurality of activities relevant to the user.

15. The non-transitory computer-readable storage medium of claim 9, wherein the instructions to obtain the first plurality of activities relevant to the user comprise the instructions to:
obtain a current time of day, a current day of a week, and a history of locations associated with the user; and
based on the current time of day, the current day of the week, and the history of locations associated with the user, determine an activity of interest to the user.

16. The non-transitory computer-readable storage medium of claim 9, wherein the instructions to create the map comprise the instructions to:
adjust an indication of the location of the second event based on an interest associated with the second event.

17. The non-transitory computer-readable storage medium of claim 9, comprising instructions to:
obtain multiple friends associated with the user;
receive an indication, including a time when the user is available, and a location where the user is available; and
create the map indicating the location where the user is available.

18. A system comprising:
at least one hardware processor; and
at least one non-transitory memory storing instructions, which, when executed by the at least one hardware processor, cause the system to:
 obtain a first plurality of activities relevant to a user;
 obtain an indication of a user's location, a speed of movement associated with the user, and a predetermined threshold indicating a length of time;

obtain a first plurality of events,
  wherein an event in the first plurality of events includes one or more activities, and
  wherein the one or more activities associated with the first plurality of events are included in the first plurality of activities relevant to the user;
based on the user's location, the speed of movement associated with the user and the predetermined threshold, determine a second plurality of events based on the first plurality of events,
  wherein the second plurality of events is at least a subset of the first plurality of events,
  wherein a second event in the second plurality of events is within the predetermined threshold away from the user's location when the user moves at the speed of movement associated with the user; and
create a map indicating a location of the second event.

19. The system of claim 18, wherein the instructions to obtain the first plurality of activities relevant to the user comprise instructions to:
  obtain an activity ontology structured into multiple hierarchical levels, including at least three of a group, an interest, an activity, and an activity analog,
    wherein the group includes a second plurality of interests,
    wherein the interest includes a second plurality of activities,
    wherein the activity includes a second plurality of activity analogs,
    wherein the activity analog includes a semantic equivalent of the activity; and
  obtain an indication of a user's interest associated with the second plurality of interests.

20. The system of claim 18, wherein the instructions to obtain the first plurality of events comprise instructions to:
  obtain a third plurality of events,
    wherein the third plurality of events is specified by one or more users of an activity ontology, or
    wherein the third plurality of events is obtained from another hardware processor operating independently of the activity ontology; and
  match a third event in the third plurality of events with an indication of a user's interest, thereby identifying the first plurality of events, by:
    obtaining the one or more activities associated with the third event in the third plurality of events;
    determining an interest associated with the one or more activities; and
    determining whether the interest matches the indication of the user's interest; and
    upon determining that the interest matches the indication of the user's interest, adding the third event to the first plurality of events.

21. The system of claim 18, comprising instructions to:
receive a selection of the second event associated with the map;
provide details associated with the second event, including attendees;
adjust an icon indicating the location of the second event to distinguish the second event from an unselected event; and
provide a user interface element enabling the user to remove the details associated with the second event from a display.

22. The system of claim 18, comprising instructions to:
provide a selection functionality associated with the map;
receive an input indicating a user preference,
  wherein the user preference includes a description associated with a particular activity;
based on the user preference selecting the second event in the second plurality of events,
  wherein the second event satisfies the user preference; and
create the map, including the indication of the second event.

23. The system of claim 18, wherein the instructions to obtain the first plurality of activities relevant to the user comprise instructions to:
  obtain an activity relevant to the user;
  obtain a plurality of activities relevant to a second user,
    wherein the plurality of activities relevant to the second user includes the activity relevant to the user;
  determine an adjacent activity associated with the user by determining the adjacent activity in the plurality of activities relevant to the second user, and
    wherein the adjacent activity is not included in the first plurality of activities relevant to the user; and
  add the adjacent activity to the first plurality of activities relevant to the user.

24. The system of claim 18, wherein the instructions to obtain the first plurality of activities relevant to the user comprise instructions to:
  obtain a current time of day, a current day of a week, and a history of locations associated with the user; and
  based on the current time of day, the current day of the week, and the history of locations associated with the user, determine an activity of interest to the user.

25. The system of claim 18, wherein the instructions to create the map comprise instructions to:
  adjust an indication of the location of the second event based on an interest associated with the second event.

26. The system of claim 18, comprising instructions to:
  obtain multiple friends associated with the user; receive an indication, including a time when the user is available, and a location where the user is available; and
  create the map indicating the location where the user is available.

* * * * *